United States Patent
Song et al.

(10) Patent No.: US 7,143,443 B2
(45) Date of Patent: Nov. 28, 2006

(54) SECURE SHARING OF PERSONAL DEVICES AMONG DIFFERENT USERS

(75) Inventors: Yu Song, San Carlos, CA (US); Hao-hua Chu, Mountain View, CA (US); Shoji Kurakake, San Francisco, CA (US)

(73) Assignee: NTT Docomo, Inc., Tokyo (JP)

( * ) Notice: Subject to any disclaimer, the term of this patent is extended or adjusted under 35 U.S.C. 154(b) by 806 days.

(21) Appl. No.: 09/968,161

(22) Filed: Oct. 1, 2001

(65) Prior Publication Data

US 2003/0065947 A1    Apr. 3, 2003

(51) Int. Cl.
G06F 12/14    (2006.01)
(52) U.S. Cl. .................................................... 726/29
(58) Field of Classification Search ............ 713/201; 707/10; 717/175; 726/29
See application file for complete search history.

(56) References Cited

U.S. PATENT DOCUMENTS

| | | | | |
|---|---|---|---|---|
| 6,055,636 A * | 4/2000 | Hillier et al. | ............... | 713/200 |
| 6,073,242 A | 6/2000 | Hardy et al. | | |
| 6,453,419 B1 | 9/2002 | Flint et al. | | |
| 6,499,109 B1 | 12/2002 | Balasubramaniam et al. | | |
| 6,510,236 B1 * | 1/2003 | Crane et al. | ............... | 382/116 |
| 6,789,191 B1 * | 9/2004 | Lapstun et al. | ............. | 713/168 |
| 6,862,594 B1 * | 3/2005 | Saulpaugh et al. | ........... | 707/10 |
| 6,889,376 B1 * | 5/2005 | Barritz et al. | ............... | 717/175 |

FOREIGN PATENT DOCUMENTS

| | | |
|---|---|---|
| JP | H10-247177 A | 9/1998 |
| JP | 2001-77858 A | 3/2001 |

OTHER PUBLICATIONS

Sandhu, R.; Coyne, Edward J.; Feinstein, Hal L. and Youman, Charles E., "Role-Based Access Control Models," *IEEE Computer*, vol. 29, No. 2, Feb. 1996.

Sandhu, Ravi and Park, Joon S., "Decentralized User-Role Assignment for Web-based Intranets," In Proc. of the 3rd ACM Workshop on Role-Based Access Control, Oct. 1998.

Tezuka, Satoru; Sasaki, Ryoichi and Kataoka, Masanori, "Seamless Object Authentication in Different Security Policy Domains," In Proc. of 33rd Hawaii International Conference on System Sciences, Jan. 2000.

(Continued)

Primary Examiner—Jacques H. Louis-Jacques
Assistant Examiner—Andrew L. Nalven
(74) Attorney, Agent, or Firm—Blakely, Sokoloff, Taylor & Zafman LLP

(57) ABSTRACT

A registry architecture for securely sharing personal devices among different users is disclosed. The registry architecture is a distributed architecture that includes at least one registry server communicating over a network with at least one personal device. The architecture provides verification and authorization of users and applications on personal devices registered with the registry server. In addition, secure migration of applications between a first personal device and at least one second personal device may be performed as a function of the registry architecture. Further, the ability to securely share a personal device among different users is provided by identification of potential users of the personal device within the registry architecture.

18 Claims, 18 Drawing Sheets

OTHER PUBLICATIONS

Demurjian, S.A.; Ting, T.C.; Balthazar, J.; Ren, H.; Phillips, C. and Barr, P., "Role-Based Security in a Distributed Resource Environment," In Proc. of Fourteenth IFIP WG 11.3 Working Conference on Database Security, Aug. 2000.

Chu, H; Song, H.; Wong, C. and Kurakake, S., "Seamless Applications over Roam . System," *UbiTools '01* (Part of *ACM UbiComp '01*), Sep. 2001, http://choices.cs.uiuc.edu/UbiTools01/.

Office Action mailed May 16, 2006. Notice for reasons for rejection. English and Japanese translations. 8 pages.

Akirhiro Hokimoto and Tatsuo Nakajima, "Mobility Support for Mobile Applications Using Service Proxies".

\* cited by examiner

SECURE SHARING OF PERSONAL DEVICES AMONG DIFFERENT USERS

FIELD OF THE INVENTION

The present invention relates generally to communication networks, and more particularly, to methods and systems for providing secure application migration and device resource sharing in network connected personnel devices.

BACKGROUND OF THE INVENTION

Personal electronic devices such as personal computers, personal digital assistants (PDA), wireless telephones and pagers have become prevalent in recent years. These devices may communicate over wireless and/or wireline networks using various capabilities related to data, voice and video communication. The networks provide interconnection of these devices with information sources as well as other similar devices. Commonly, the networks include communication over the Internet.

Typically, users of such personal electronic devices obtain access to the networks using a service provider. The service provider provides a data channel allowing the user access to the network. The data channel may not be accessible by the user until the service provider verifies the identity of the user. This is typically done through a user id and password. Upon verification, the user is provided access to the data channel for transmittal and/or receipt of information. In addition, personalized data and functionality may also be provided.

Verification of the identity of the user is performed by a centralized security architecture. The centralized security architecture requires all the user information be stored, modified, and authenticated/authorized through a central server and/or server cluster. Such centralized architecture requires a powerful server (server cluster) that may not scale well in the presence of heavy usage. In addition, providers of centralized security architectures and corresponding security services, may have almost unlimited control of the user information. This level of control may raise privacy concerns for users.

Due to the inherent mobility of many of these devices, migration of an application among different devices is possible. Migration allows an application to move from one computing device to another computing device while maintaining the state of the application. For example, a user working with a calendar application on his desktop personal computer to plan a business trip may migrate the application to his PDA to continue working when he leaves his desk. In these situations, the application may be transferred over the network from one device to another.

Problems with security, authorization and authentication may occur when an application migrates. This is especially true where a first user elects to access the network using a device belonging to a second user. In this situation, data belonging to the first user may need to be downloaded to the device belonging to the second user. Encryption and decryption may be difficult if the second user's device does not include the appropriate encryption/decryption capability. In addition, security of the application during the migration as well as authentication that the first user is allowed to perform the migration are concerns.

Privilege levels within a device hosting a migrated application may also need to be restricted depending on the user. For example, air time or website access restrictions for a wireless telephone may be desirable for some users. Other users, however, may need more relaxed or eliminated restrictions when running the same application on the same device. In addition, restrictions of an application running on some devices may not be required when the application is run on other devices. For example, airtime restrictions for a wireless telephone may not be necessary when a desktop computer is accessing the network using wirelines.

SUMMARY OF THE PRESENT INVENTION

The present invention discloses a registry architecture for authentication and verification of personal devices communicating over a network. The registry architecture is a distributed architecture that includes at least one personal device and at least one registry server. A plurality of registry servers, each maintaining registration of different groups of personal devices, may be separately and independently operated and maintained within the registry architecture. This decentralized approach provides an easily scalable system that increases privacy by limiting distribution of a users' registration information.

Authorization and authentication are also provided by the registry architecture. Owners of personal devices may register each of the devices with the registry server. The registry server includes a database of security information. The security information for each personal device includes owner data and a device record. The device record includes identification of potential users of the personal device along with a privilege level. The privilege level establishes a level of access to functionality available within the personal device. When a user operates a personal device, the device record associated with the device may be utilized to verify the user has authority to operate the device and to establish the privilege level. As such, personal devices may be shared among different users with authority to operate the personal devices.

The registry architecture also facilitates secure migration of applications between a first personal device and a second personal device. In one embodiment, different owners may register the first and second personal devices with different registry servers. Authorization and verification of the migration, as well as the users, may be performed as a function of information within the first and second registry servers. In addition, when either the first or second registry servers are unavailable, the first or second personal devices may utilize locally stored security information to facilitate secure migration.

Another interesting feature of the registry architecture is the capability to avoid transmission of unsecured sensitive information. This capability includes provisions to allow entry of login information on a personal device trusted to maintain security. The trusted personal device may be a different device than the personal device currently requesting login information. In addition, this capability includes linking between registry servers as well as encryption/decryption keys to maintain secure communication over the network.

Yet another interesting feature of the registry architecture is the security and authorization functionality pertaining to migration of an application with a peer group of personal devices. In this embodiment, the application is divided into components, namely, a first portion and at least one second portion. The first portion is securely migrated to a target personal device as a function of the registry architecture. The at least one second portion is securely migrated to other personal devices within the targeted personal device's peer group as a function of the registry architecture.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS OF THE INVENTION

The presently preferred embodiments describe a registry architecture to provide a security function in a network environment. The registry architecture is a distributed architecture providing authentication and authorization of both an application user and an application the user is running. The authentication and authorization functions of the registry architecture provide security to prevent unauthorized access to applications and data as well as maintaining the integrity of applications currently in operation. The registry architecture allows migration of running applications to different hardware platforms. Resource sharing of hardware among different users is also supported by the registry architecture based on existing privileges allocated to the user running the application. In addition, the registry architecture provides for secure communication of data over a network. Further, the registry architecture performs an authenticating function to confirm that applications have not been modified or otherwise corrupted during operation.

Figure 1:
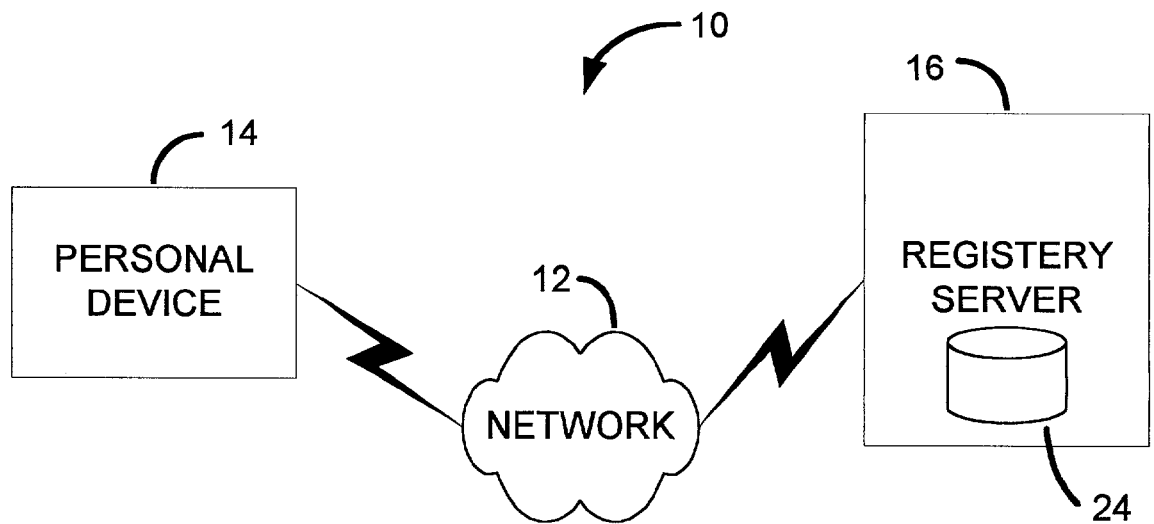
FIG. 1 is a block diagram of an embodiment of a registry architecture that includes a personal device and a registry server.

FIG. 1 illustrates an exemplary embodiment of a registry architecture 10. The registry architecture 10 includes a network 12, at least one personal device 14 and at least one registry server 16 operative coupled as illustrated. As used herein, the term "coupled" or "connected" may mean electrically coupled, optically coupled or any other form of coupling providing an interface between devices and/or components.

The network 12 may include the Internet, a public or private intranet, an extranet, and/or any other form of network configuration to enable transfer of data and commands. As referred to herein, the network 12 should be broadly construed to include any software application and hardware devices used to provide interconnected communication between devices and applications. For example, interconnection with the Internet may involve connection with an Internet service provider obtained using, for example, modems, cable modems, ISDN connections and devices, DSL connections and devices, fiber optic connections and devices, satellite connections and devices, wireless connections and devices, Bluetooth connections and devices, or any other communication interface device. Similarly, intranets and extranets may include interconnections via software applications and various computing devices (network cards, cables, hubs, routers, etc.) that are used to interconnect various computing devices and provide a communication path.

Communication within the network 12 may be performed with a communication medium that includes wireline based communication systems and/or wireless based communication systems. The communication medium may be for example, a communication channel, radio waves, microwave, wire transmissions, fiber optic transmissions, or any other communication medium capable of transmitting data.

An exemplary communication protocol is the Transport Control Protocol/Internet Protocol ("TCP/IP") network protocol suite, however, other Internet Protocol based networks, proprietary protocols, or any other form of network protocols are possible. Communications may also include, for example, IP tunneling protocols such as those that allow virtual private networks coupling multiple intranets or extranets together via the Internet. The network 12 may also support application protocols, such as, for example, telnet, POP3, Mime, HTTP, HTTPS, PPP, TCP/IP, SMTP, proprietary protocols, or any other network protocols known in the art.

The personal device 14 may be any device used by a user for communication of digital information over the network 12. Although only a single personal device 14 is illustrated in FIG. 1, any number of personal devices 14 may be coupled with the network 12. The personal device 14 is designed to provide predetermined functionality with resources such as, for example, memory, data storage, computing capabilities, peripherals, etc. Exemplary personal devices include wireless telephones, personal digital assistants (PDAs), pagers, laptop computers, desktop computers, video conferencing devices, televisions, MP3 players, television set top boxes, game consoles or any other device capable of sending and/or receiving information over the network.

As used herein, the term "personal device" refers to devices that are owned by an individual user or an organization. Organizations typically distribute devices to a "primary user" to possess and use such devices. As used herein, the term "primary user" is the owner of the personal device 14 when a private individual owns the personal device 14. In addition, the term "primary user" may be the individual provided exclusive use, responsibility and control of a personal device 14 owned by an organization. Further, as used herein, a "user" of a personal device 14 may be the primary user or any other individual operating the personal device 14 unless otherwise indicated. Accordingly, the "user" of a personal device 14 is not necessarily the "primary user" of a personal device 14.

In the presently preferred embodiments, the personal device 14 runs applications operated by the user of the device. Applications in the form of software, firmware or some other form of computer code may include the device's operating system, as well as any other applications the personal device 14 is designed to run. As used herein, the term "application" may refer to an executable program and/or any accompanying data files operated with an executable program. For example, a user may activate a personal device 14 such as a cell phone. When the cell phone is activated, an application is launched to provide the functions available from the cell phone such as dialing and receiving phones calls. In addition, the user may initiate other applications such as, interactive messaging, an Internet browser, email services, stock market information services, music services or any other functionality included with the personal device 14.

In one embodiment, the complexity and amount of functionality provided by applications operating within the personal device 14 is a function of the on-board resource capabilities of the personal device 14. On-board resource capabilities include, for example, computing power, memory, data storage capability and other operational capabilities related to executing applications. In another embodiment, the personal device 14 may run a first portion of an application with on-board resource capabilities while relying on other external resource capabilities to run a second portion of the application.

The personal device 14 also preferably includes security related applications. One such application is preferably a prompt for login information when the personal device 14 is activated. The login information may be, for example, a user name and password, data from a personal information storage device (such as a personal information card), a biological scanner (such as a voice, fingerprint or retina scanner) and/or any other mechanism for identifying a user. In another embodiment, the personal device 14 does not include capability to receive login information. In this embodiment, applications within the personal device 14 permit the selection of another personal device 14 with capability to receive the login information. In yet another embodiment, both the personal device 14 and other personal devices 14 may be selectively utilized to receive login information.

Other security related functionality preferably included within each application associated with the personal device 14 is the ability to generate a session universal identification (UID). The session UID may be randomly generated as a digitized unique identifier of each session of an application. Generation of the session UID may occur when a session of the application is launched. The session UID may be stored and used during the session to verify the application remains the same. Tampering, modifications or corruption of the application preferably alters or destroys the stored session UID. In addition, shutdown and restart of an application generates a new session UID.

Another security related functionality preferably included within applications launched from the personal device 14 is a prompt for an application password. The application password is application specific and is valid during the runtime of the instance of an application. When an application is shutdown, the application password preferably becomes invalid. The session UID as well as the application password may be utilized within the registry architecture 10 for authentication of applications.

Still other security related applications are preferably available for secure transmission of data to and from the personal device 14. One exemplary standard for secure data transmission over the Internet is the well-known secure socket layer (SSL) connection. Another well-known form of secure data transmission involves applications with encryption/decryption capability utilizing a unique private key and a unique public key. For encryption, these applications use the public key. The private key is used for decryption of encrypted communications from other devices. For purposes of the remaining discussion, devices transmitting non-public data prior to the exchange of unique public keys may use a secure connection with standard secure data transmission techniques unless otherwise indicated. Similarly, devices transmitting non-public data following the exchange of unique public keys may utilize the unique private and public keys for encryption and decryption unless others indicated.

The personal device 14 may also include an address identifying the personal device 14 on the network 12. The address is preferably unique and may be, for example, a uniform resource locator (URL), a uniform resource identifier (URI) or an Internet protocol (IP) address. In other embodiments, other types of addresses or any other type of locating mechanism for uniquely identifying the personal device 14 are possible. The address allows communication with other personal devices 14, the registry server 16 and/or any other devices coupled with the network 12.

Figure 2:
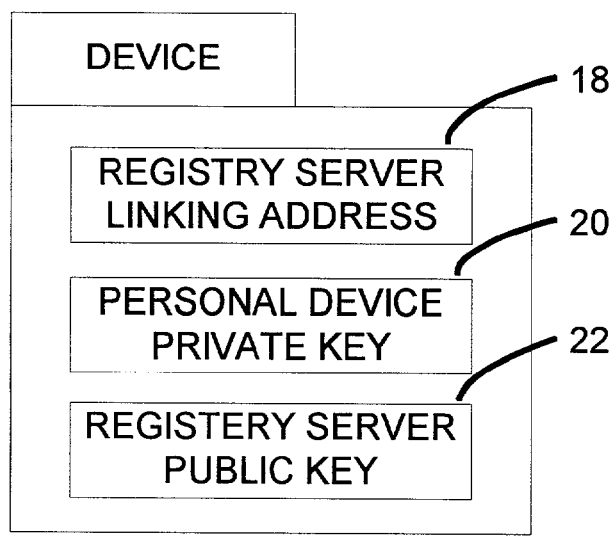
FIG. 2 illustrates a portion of the information stored in an embodiment of the personal device illustrated in FIG. 1.

FIG. 2 illustrates one embodiment of a portion of the information stored in the personal device 14 to access and communicate with the registry server 16 (FIG. 1). The information includes a registry server linking address 18, a personal device private key 20 and a registry server public key 22. The registry server linking address 18 may be some form of address identifying the location of the registry server 16 on the network 12 (FIG. 1). Similar to the personal device address, the address may be, for example, a uniform resource locator (URL), a uniform resource identifier (URI), an Internet protocol (IP) address or some other locating mechanism for uniquely identifying the registry server 16.

The personal device private key 20 is preferably generated by an application within the personal device 14. The personal device private key 20 may be utilized to selectively decrypt data transmitted to the personal device 14. The registry server public key 22 may be used for encryption of data transmitted to the registry server 16 by the personal device 14. In other embodiments, additional public keys may be utilized to encrypt data transmitted to other sources on the network 12 such as, for example, other personal devices 14. In still other embodiments, other forms of encryption/decryption may be utilized for secure communication between the personal device 14, other personal devices 14, the registry server 16 and/or any other devices communicating on the network 12.

Referring again to FIG. 1, the registry server 16 may be one or more server computers or other similar devices providing an authentication and authorization function for the personal device(s) 14. In the exemplary embodiment, the registry server 16 includes a database 24 to perform the authentication and authorization function. In other embodiments, additional server computers and/or databases may be used. The registry server 16 also runs applications that store, maintain and allow interface to the data within the database 24. Applications, such as, for example, a database management system (DBMS) or other similar application may organize and coordinate the storage and retrieval of data from the database 24.

The database 24 may be stored in a storage device, such as, for example, at least one hard drive, an optical storage media, or any other data storage device allowing read/write access to the data. The data within the database 24 may be stored in one centralized physical location or may be distributed among multiple physical locations within the network 12. Data within the database pertains to authentication, authorization and general security of the personal devices 14 operating on the network 12. The database 24 includes a device record maintained for each personal device 14. Creation of the device record occurs when the personal device 14 is registered with the registry server 16 as will be described later.

The registry server 16 of the presently preferred embodiments also operates at least one application that forms an interface to the database 24. The interface provides a communication path to view, manipulate, add and delete data within the database 24. In one embodiment, the interface is implemented as an Internet, intranet or extranet accessible site using a browser such as, for example, Microsoft™ Internet Explorer. In other embodiments, other forms of interface are implemented such as, for example, dial up access, proprietary data screens, or any other form of interface to data within the database 24. The interface is preferably secure requiring users to register or login for access to the database 24.

The registry server 16 may also include applications for secure communications such as, for example, SSL protocol communication. Other secure communication applications may include encryption/decryption of communications using private and public keys. In other embodiments, any other applications providing secure communication over the network 12 may be utilized.

The capability to generate at least one unique private/public key pair may be included in the registry server 16 for encryption of outgoing messages. In one embodiment, the registry server 16 also includes a regeneration feature for previously generated unique private/public key pair(s). Regeneration of the private/public key pair(s) provides an additional layer of security. The registry server 16 may periodically notify the primary user and generate replacement private/public keys. Once generated, the replacement public/private key(s) may be stored in the database 24 to replace the existing public/private key(s). In addition, the registry server 16 may transmit the replacement public key(s) to any personal devices 14 or registry servers 16 identified in the database 24. The replacement public key(s) may be received and stored by these devices to replace the existing public key(s).

Applications providing comparison-based verification of data within the database to data received over the network 12 may also be included in the registry server 16. In addition, the registry server 16 may also include applications with the ability to temporarily store data received over the network 12 in the database 24. Further, applications providing functionality such as, for example, firewall protection, administrative capabilities, proxy capability and any other server related functionality may also be included within the registry server 16.

In one embodiment, the registry server 16 is a personal registry server (PRS) for individual owners of personal devices 14. The database 24 of the PRS may include personalized security information for each owner registered therewith. In addition, the database 24 may include a list of personal devices 14 commonly owned by that owner. The PRS is a personalized database and application server preferably providing a registration service for individual owners of one or more personal devices 14.

Figure 3:
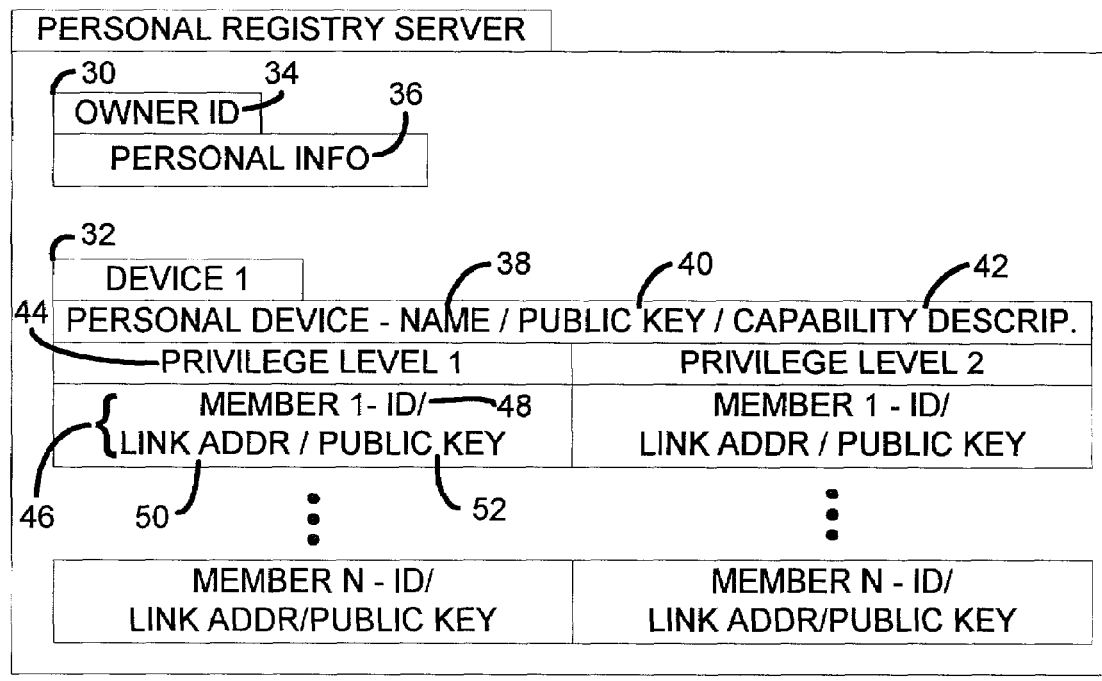
FIG. 3 illustrates a portion of the information stored in an embodiment of the registry server illustrated in FIG. 1.

FIG. 3 illustrates one embodiment of the security information included in the registry server 16 operating as a PRS. The information included for each owner of personal devices 14 includes owner data 30 and at least one device record 32 for at least one personal device 14. In other embodiments, additional information, such as, for example, billing information, usage patterns, usage history and/or, location of devices (based on global positioning satellites (GPS) for example) may also be included. In addition, the reader should recognize that other nomenclature, presentations and arrangements than those illustrated in FIG. 3 are possible to provide similar information and functionality.

The owner data 30 of one embodiment includes an owner identity 34 and personal information 36. The owner identity 34 may be the legal name or other similar identifier of the owner of the personal devices 14. The personal information 36 may include any information pertaining to the owner, such as, for example, date of birth, social security number, credit card information, user name, password or any other personal information.

The device record 32 may be one of many device records 32 forming an owner list of commonly owned personal devices 14 registered with the registry server 16 by an owner. As illustrated in FIG. 3, a first personal device 14 is identified as "device 1" and additional commonly owned personal devices 14 may be similarly included as separate device records 32 ("device 2" etc.) to create the list. Within the owner list, a primary user list may also be formed. The primary user list may identify those personal devices utilized by the same primary user. Similarly, a list of personal devices utilized by any other user may also be formed. In other embodiments, other types of lists may also be formed such as, for example, similarly functioning personal devices, similarly geographically located personal devices, or any other type of listing to aid in authorization and verification.

In one embodiment, each of the device records 32 includes a personal device name 38, a personal device public key 40, a personal device capability description 42 and at least one privilege level 44. The personal device name 38 may identify the type of personal device, such as, for example, PDA, wireless phone, television, etc. The personal device public key 40 may be used in conjunction with an encryption/decryption application for encrypting communications transmitted to the personal device 14. The personal device capability description 42 may include a functionality description, peripherals, resources and any other features related to the capability available within the personal device 14. Exemplary personal device capability description 42 information includes login capability, available applications, video capability, voice capability, data entry capability, communication bandwidth and resource capability such as memory, data storage, computing power, etc.

The personal device capability description 42 may also include identification of the personal device 14 as a device the primary user is comfortable entering/inputting login information. The comfort level of the user may be based on the privacy levels associated with utilizing the personal device 14 to enter login information, the convenience, and/or any other user preference. By entering/inputting information on such identified devices, the user avoids providing login information to devices that may store or otherwise capture the login information without the users knowledge or consent. In addition, the identified devices include the capability to receive login information with peripheral devices the user is familiar with using for login.

The privilege level 44 identifies a level of access available to anticipated users of the personal device 14. As illustrated by "Privilege Level 1" and "Privilege Level 2" in FIG. 3, multiple access levels may be implemented at the discretion of the owner of the personal device 14. The quantity and types of access levels are dependent on the characteristics and deployment of the personal device 14. For example, the owner of a wireless phone may set three different privilege levels: Owner, Family, and Public. The Owner privilege allows total control of the functionality of the wireless phone. The Family privilege allows restricted airtime, but does not allow access to the configurable functions of the phone. The Public privilege allows no access to the wireless phone.

Each privilege level 44 may include at least one member 46. In the illustrated embodiment, each privilege level 44 includes a first member ("Member 1") and a second member ("Member N") to illustrate any number of members may be included in a privilege level 44. The member 46 identifies an anticipated user of the personal device. In one embodiment, the member 46 includes a member identification 48, a member linking address 50 and a member public key 52. The member identification 48 may be a user name or any other unique identification of the user anticipated to operate the personal device 14. The member linking address 50 is an address or some other form of link to the registry server 16 of the user identified in the member identification 48. The member public key 52 may be used to encrypt communications transmitted to the registry server 16 identified by the linking address 50.

The registry server 16 of another embodiment is an organizational registry server (ORS) for users of personal devices 14 within an organization, such as, for example, a business or corporation. The database 24 of the ORS may include security information relating to the organization and administrators of the ORS as well as information related to each of the personal devices 14 owned by the organization.

In one embodiment, the ORS may be configured with at least one sub-group registry server (subgroup ORS) in communication with a group registry server (group ORS). The subgroup ORS may include a database 24 (FIG. 1) supporting, for example, authorization and authentication within a branch office, department, division or any other sub-grouping within the organization. The group ORS may include a database 24 (FIG. 1) supporting for example, one or more sub-group ORSs. In addition, the group ORS may perform authorization and authentication within a part of the organization similar to the subgroup ORS.

The group ORS may be the point of contact on the network 12 (FIG. 1) for personal devices 14 and any other devices external to the group. In addition, the group ORS may also act as a pass through point for communications from personal devices 14 within the subgroup ORS to such external devices. Communication between the subgroup ORS and the group ORS maintains distributed authentication and authorization of all the personal devices 14 owned by the organization.

In another embodiment, the ORS may be configured as at least two subgroup ORSs communicatively coupled to maintain communication. In yet another embodiment, the ORS is a single registry server 16 with a database 24 (FIG. 1) that includes the personal devices 14 for the entire organization.

Figure 4:
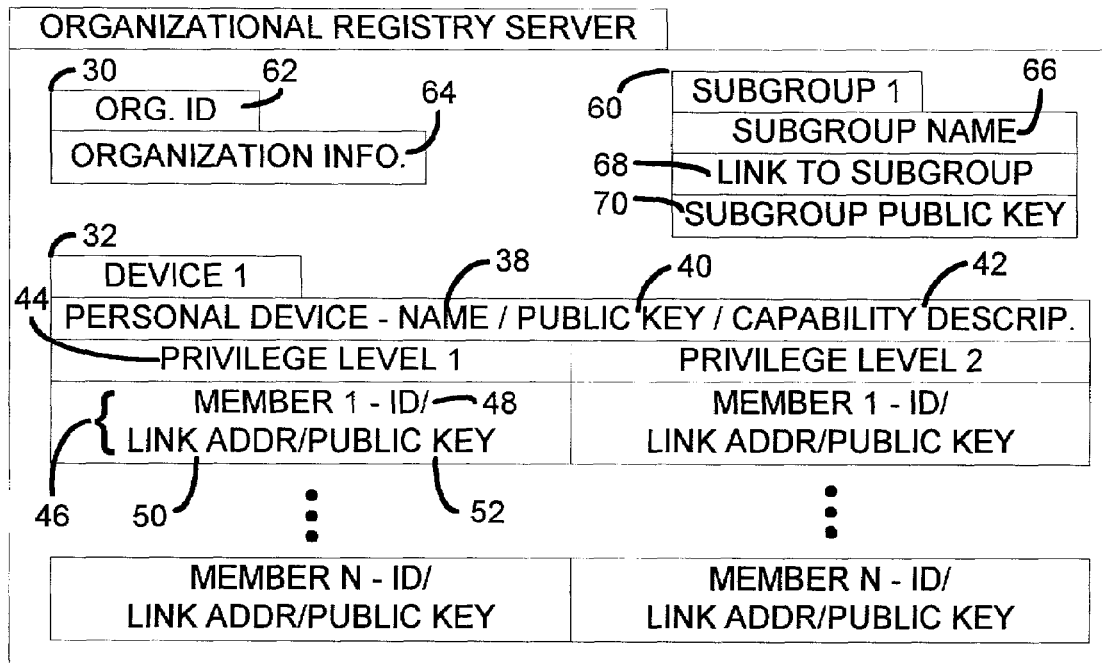
FIG. 4 illustrates a portion of the information stored in another embodiment of the registry server illustrated in FIG. 1.

FIG. 4 illustrates one embodiment of the security information in the ORS. The information included for the organization includes the owner data 30, at least one device record 32 and at least one subgroup information 60. In other embodiments, additional information, such as, for example, billing information, usage patterns, usage history, data monitoring and/or, location of devices (for example by GPS) may also be included.

The owner data 30 of the illustrated embodiment includes an organization identity 62 and organization information 64. The organization identity 62 may be the legal name or other similar identifier of the organization that owns the personal devices 14. The organization information 64 may include any verification information pertaining to administrators of the ORS. Verification information may be, for example, administrator user names, passwords or any other identifying information for those individuals/groups maintaining the ORS for the organization.

The subgroup information 60 may be any information identifying a subgroup of the organization. Where multiple subgroups are present, the subgroup information 60 may form a subgroup list of different subgroups within the organization. As illustrated in FIG. 4, the first subgroup is identified as "Subgroup 1" and additional subgroups of the organization may be included as "Subgroup 2," etc. to form the subgroup list within the ORS.

In one embodiment, the subgroup information 60 includes a subgroup name 66, a subgroup linking address 68 and a subgroup public key 70. The subgroup name 66 may be a name or other similar identifier for the subgroup. The subgroup linking address 68 may be used in the embodiment of the ORS that includes a group ORS and a subgroup ORS. In this embodiment, the subgroup associated with the subgroup name 66 is included in the subgroup ORS. Accordingly, the subgroup linking address 68 may identify the location within the network 12 (FIG.1) of the subgroup ORS. The subgroup public key 70 is the public key used to communicate with the subgroup ORS identified by the subgroup linking address 68.

The device record 32 is similar to the device record 32 described with reference to FIG. 3 and includes the personal device name 38, the personal device public key 40, the personal device capability description 42, the privilege level 44 and at least one member 46. It should be noted however, that the device record is associated with the subgroup name 66 and therefore different subgroups within the ORS will include different device records 32. In addition, the primary users of individual devices within the ORS will be identified as members 46 within the device record 32.

In other embodiments, a combination of PRS and ORS type registry servers 16 may operatively communicate on the network 12 with each other and the personal devices 14.

1.0 Personal Device Registration

Figure 5:
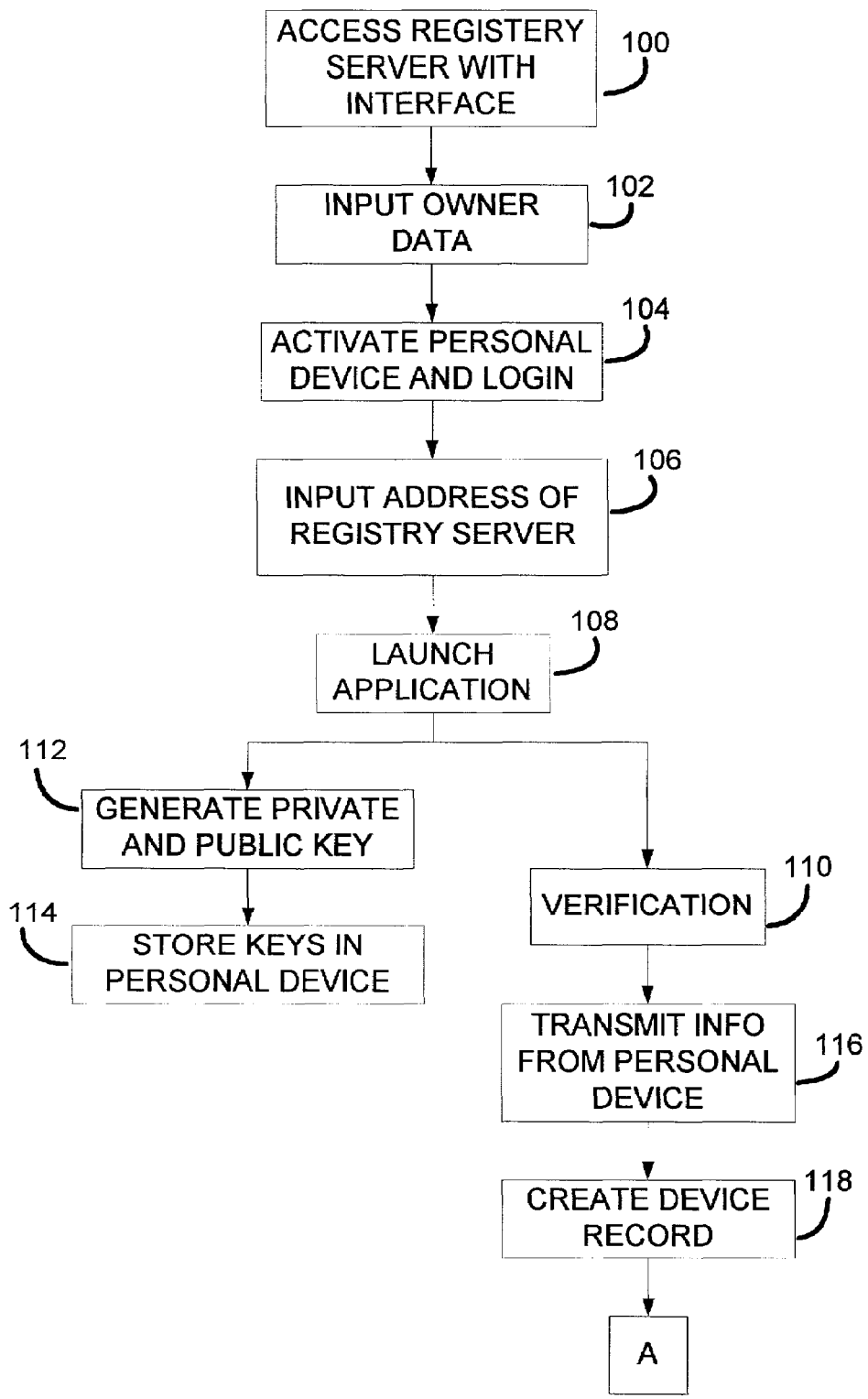
FIG. 5 is a flow diagram illustrating registration of the personal device illustrated in FIG. 1 with the registry server illustrated in FIG. 1.

FIG. 5 is a process flow diagram illustrating initiation of operation of the previously described registry architecture 10 with reference to FIGS. 1–4. To begin operation, access to the registry server 16 is established via the interface at block 100. At block 102, the owner data 30 is entered into the database 24 with the interface. The personal device 14 is activated and login information is provided at block 104. At block 106, a unique address identifying the location of the registry server 16 in the network 12 is entered on the personal device 14.

An application is launched within the personal device 14 to initiate communication with the registry server 16 at block 108. At block 110, the registry server 16 performs verification by comparing the login information and the owner data 30. The personal device 14 generates the personal device private key 20 and the personal device public key 40 pair at block 112. In addition, at block 114, the personal device 14 stores the personal device private key 20 and the public key 40. At block 116, the personal device 14 sends the personal device name 38, the personal device public key 40 and the personal device capability description 42 over the network 12 to the registry server 16. The transmission is through a secure connection such as, for example, an SSL connection or other similar standard protocol for secure data transmission. At block 118, a device record 32 associated with the owner data 30 is created for the personal device 14.

Figure 6:
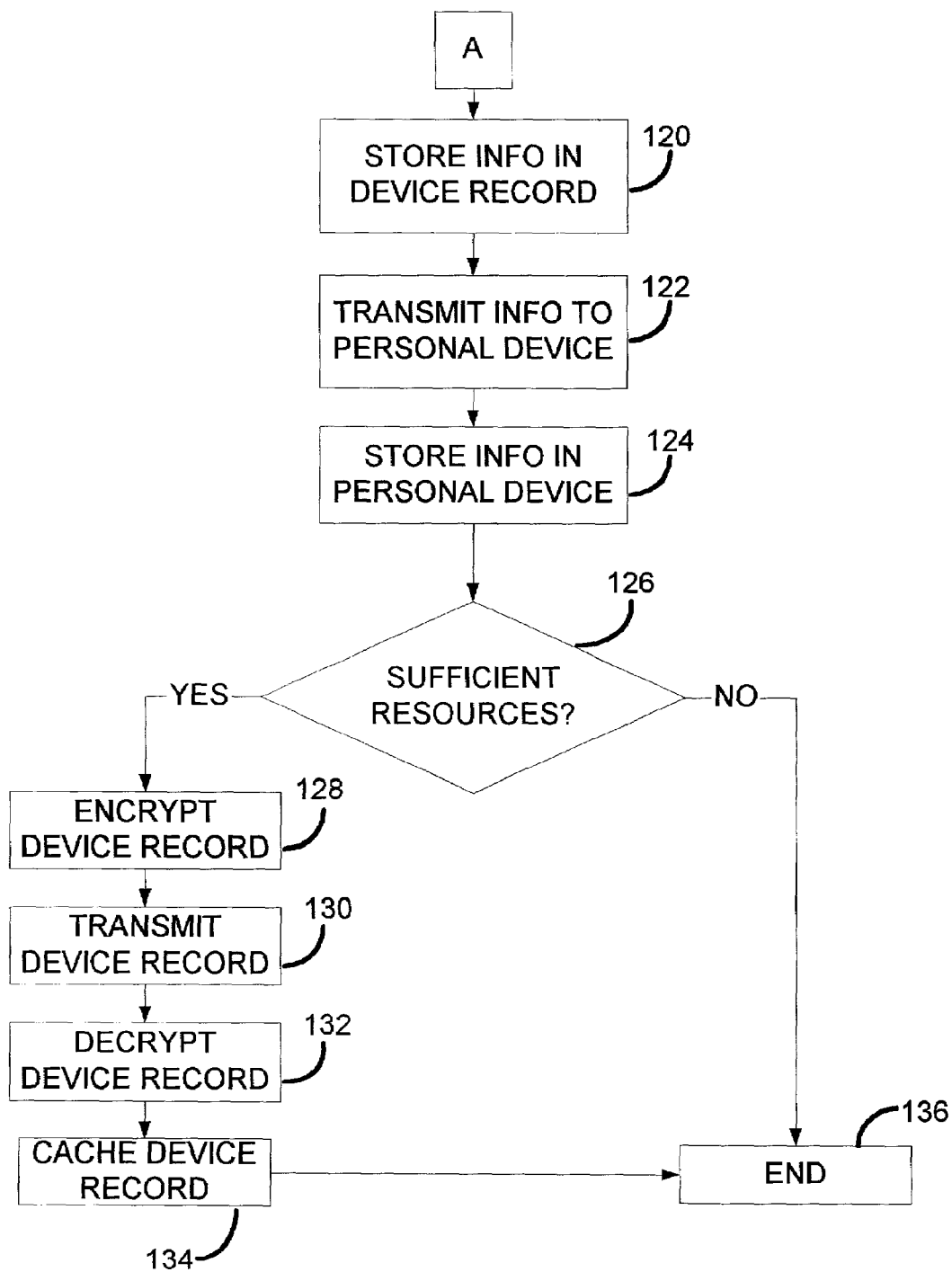
FIG. 6 is second portion of the flow diagram illustrated in FIG. 5.

Referring now to FIG. 6, the transmitted data is stored in the device record 32 within the database 24 of the registry server 16 at block 120. At block 122, the registry server 16 transmits over the network 12 the linking address of the registry server 16 and the registry server public key 22 to the personal device 14 through a secure connection. The information is stored in the personal device 14 at block 124.

At block 126, the personal device capability description 42 is reviewed for sufficient storage capability within the personal device 14 to store the corresponding device record 32. If the personal device 14 has sufficient storage, the registry server 16, using the personal device public key 40, encrypts the device record 32 at block 128. The encrypted device record 32 is transmitted over the network 12 to the personal device 14 at block 130. At block 132, the personal device 14 decrypts the device record 32 with the personal device private key 20. The device record 32 is cached in local storage of the personal device 14 at block 134. At block 136, the registration process ends. Conversely, if the personal device capability description 42 indicates insufficient storage resources are present in the personal device 14, the registration process ends at block 136.

In one embodiment, the device record 32 is cached in the personal device 14 for situations where the registry server 16 is not available. In these situations, the personal device 14 may use the locally stored information for authorization and verification related activities. When communication with the registry server 16 is restored, the personal device 14 may synchronize the device record 32 stored locally with the device record 32 stored in the database 24 of the registry server 16. In other embodiments, device record 32 may be stored in other devices in addition to the registry server 16, such as, for example, other personal devices. In this embodiment, when the registry server 16 is unavailable, other devices may be used as a source of the device record 32 information. When the registry server 16 becomes available, the other devices synchronize the stored information with the information in the registry server 16.

The process described with reference to FIGS. 5 and 6 is one embodiment illustrating initiation of operation of the registry architecture. In other embodiments, other processes to accomplish a similar result may be utilized. For example, the data may be extracted as well as stored in the personal device 14 and the registry server 16 by other techniques. Techniques such as, for example, manual copying, data entry, manual download or any other technique for providing data to the personal device 14 and the registry server 16 may be used. In addition, portions of the processes of FIGS. 5 and 6 may be used in conjunction with other techniques to achieve a similar result.

Referring again to FIGS. 1–4, following exchange of information between the personal device 14 and the registry server 16, at least one potential user may be identified. Identification provides permission for one or more potential users to operate the personal device 14. Potential users may be identified individually in the device record 32 for each personal device 14 at the discretion of the owner. Within a selected device record 32, a privilege level 44 may be developed or, an existing privilege level 44 may be selected. For example, the primary user of the personal device 14 owned by an organization may be identified in a first privilege level 44, and other employees may be identified in a second privilege level 44 with a lesser level of access.

Potential users of a personal device 14 are identified as members 46 in the device record 32. As such, information pertaining to the potential users may be input into the member information 38. More specifically, the user name of the potential user is supplied as the member identification 48. In addition, a corresponding registry server address is provided for the member linking address 50 and a public key is provided for the member public key 52. For each anticipated user of the personal device 14, there is a degree of trust between the anticipated user and the owner. Due to the trust relationship, the linking address and the public key of the anticipated user remains confidential. Such a direct trust relationship may eliminate the need for involvement of third party certification to establish an indirect trust chain between the owner and the anticipated user.

The addition of potential users may be performed by accessing the registry server 16 via the interface. Alternatively, where the personal device 14 includes sufficient resource capabilities, potential users may be added to the device record 32 using the personal device 14. In other embodiments, the addition of potential users may be performed from the personal device 14 using an automated or semi-automated application. For example, where a personal device 14 has limited data entry capability, a previously unidentified potential user attempting to use the personal device 14 may be verified and added to the device record 32 through a semi-automated verification process performed by the primary user of the personal device 14. In still other embodiments, another personal device 14 or any other device on the network 12 may be utilized to add potential users.

2.0 User Authentication and Authorization

Figure 7:
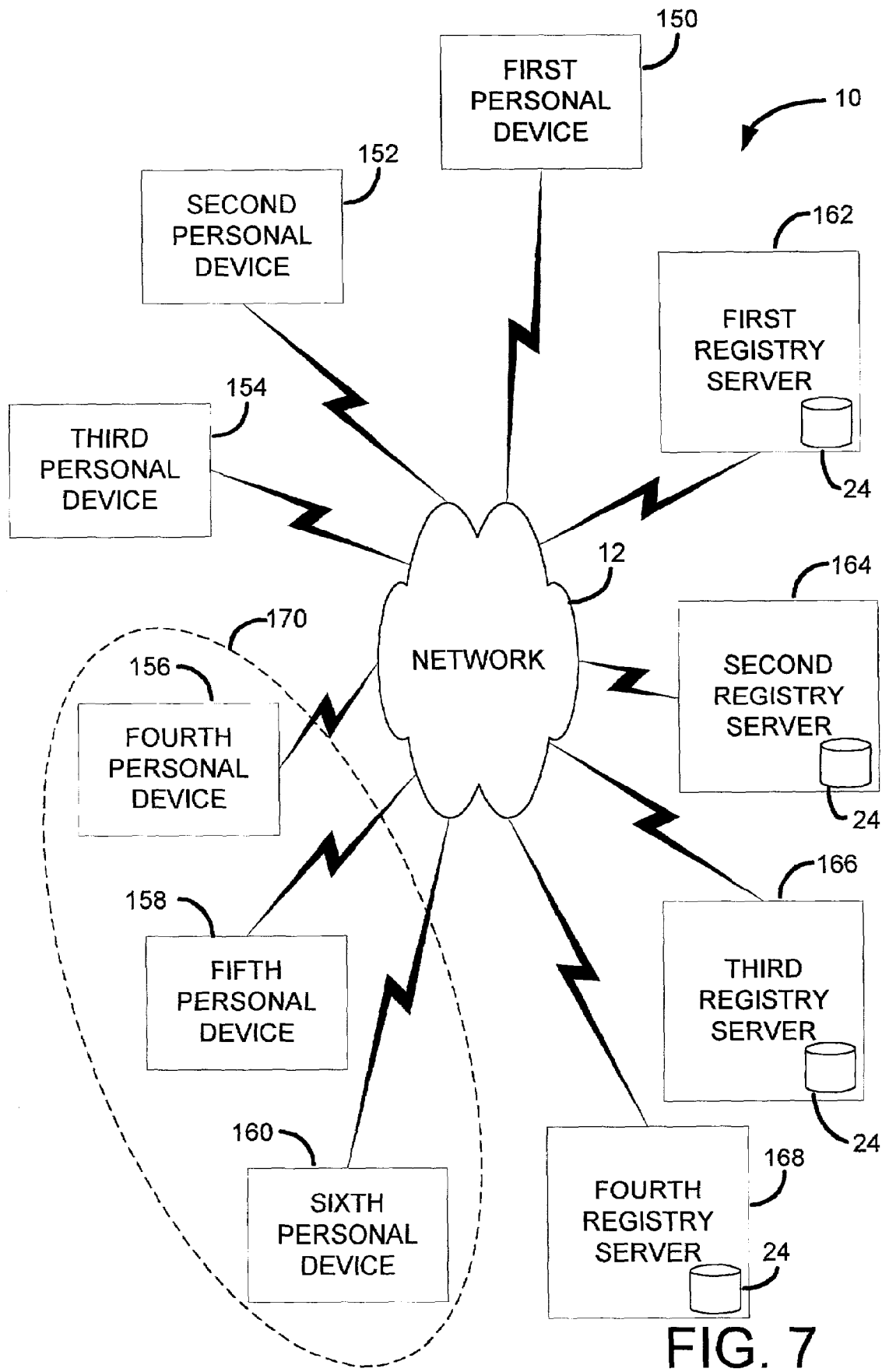
FIG. 7 is a block diagram of another embodiment of a registry architecture that includes a plurality of personal devices and a plurality of registry servers.

FIG. 7 illustrates another exemplary embodiment of the registry architecture 10. In this embodiment, the registry architecture 10 includes a first personal device 150, a second personal device 152, a third personal device 154, a fourth personal device 156, a fifth personal device 158, a sixth personal device 160, a first registry server 162, a second registry server 164, a third registry server 166 and a fourth registry server 168 communicatively coupled with the network 12. The first, second third, fourth, fifth and sixth personal devices 150, 152, 154, 156, 158, 160 are similar to the personal device 14 discussed with reference to FIG. 1. In addition, the first, second, third and fourth registry servers 162, 164, 166 and 168 each include a database 24 and are similar to the previously discussed registry server 16 (FIG. 1).

In the illustrated embodiment, the first, second and third personal devices 150, 152, 154 are commonly owned devices previously registered with the first registry server 162. As such, the first registry server 162 includes device records 32 (FIGS. 3 and 4) for each device linked to the common owner. In addition, for illustrative purposes, a first primary user utilizes the first, second and third personal devices 150, 152, 154. The fourth personal device 156 is similarly registered with the second registry server 164 and is utilized by a second primary user. Similarly, the fifth and sixth personal devices 158, 160 are registered with the third and fourth registry servers 166, 168, respectively for use by a respective third and fourth primary user. In other embodiments, any number of personal devices/registry servers may be configured in any relationship with any number of owners and primary users.

2.1 Application Start-up

Figure 8:
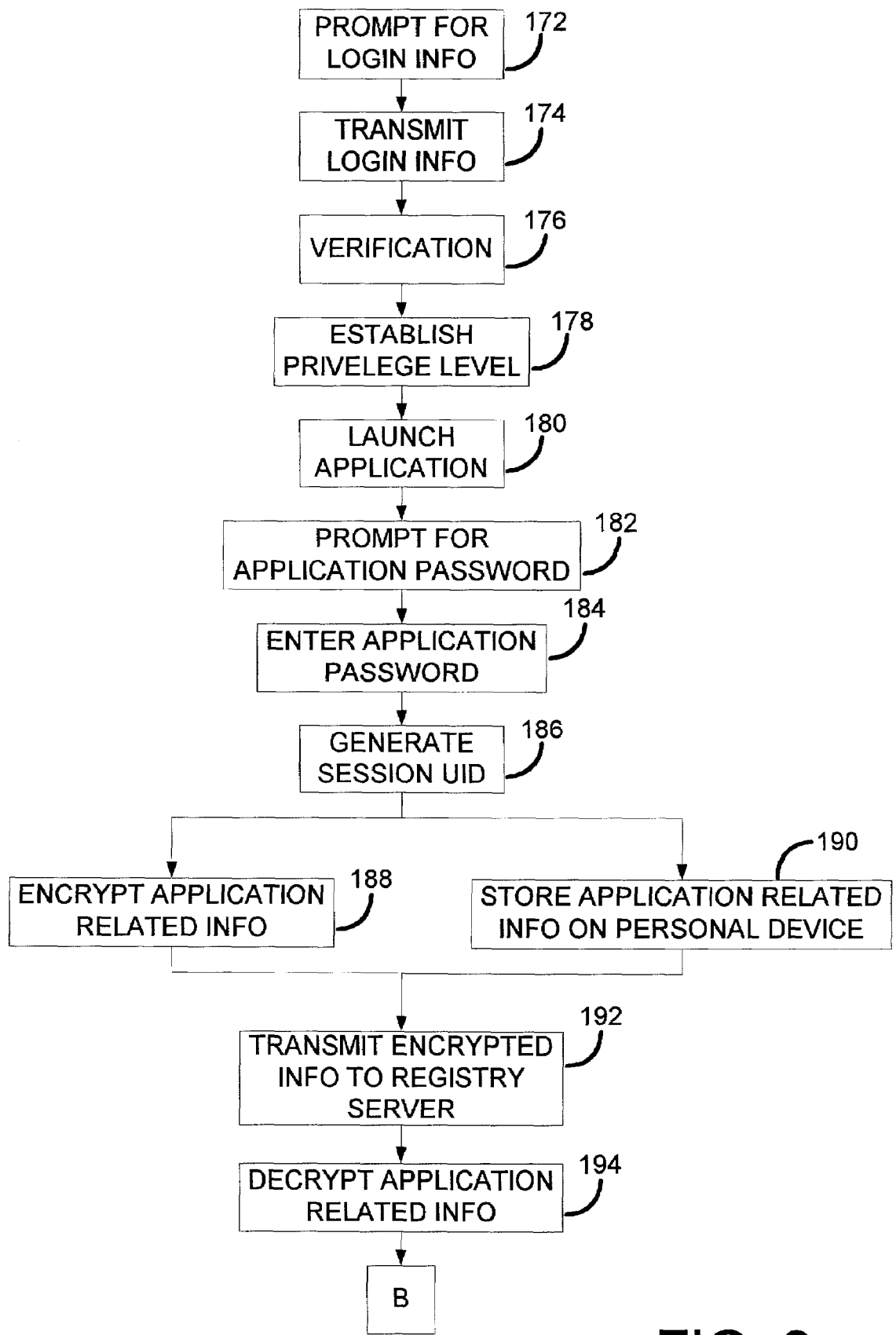
FIG. 8 is a flow diagram illustrating starting an application within the registry architecture depicted in FIG. 7.

FIG. 8 is an exemplary process flow diagram to illustrate the launching of an application within the embodiment of the registry architecture 10 illustrated in FIG. 7. In the below discussion of operation, the first primary user is starting an application on the first personal device 150. In other embodiments, other personal devices may be operated similarly by corresponding primary users. In still other embodiments, other users identified as potential users may similarly operate any of the first, second, third, fourth, fifth and sixth personal devices 150, 152, 154, 156, 158, 160.

When the first personal device 150 is activated, the first primary user is prompted to provide login information at block 172. At block 174, the login information is transmitted to the first registry server 162 to identify the user as the first primary user. The first registry server 162 performs verification by comparing the login information with the data in the database 24 at block 176. Following successful verification, the privilege level is established at block 178, and the first primary user may launch an application with the first personal device 150.

At block 180, the first primary user launches an application on the first personal device 150. The first personal device 150 prompts for an application password at block 182. The application password is for the launched application and is valid for the lifetime of the application. At block 184, the first primary user enters the application password.

Following entry of the application password, the first personal device 150 generates a session universal identification (UID) for the application at block 186. At block 188, the public key of the first registry server 162 is used to encrypt application-related information generated by the application. In addition, the first personal device 150 associates the application-related information to the running application and stores the information locally at block 190. The application-related information includes the session UID, the application name and the previously entered application password. At block 192, the encrypted application-related information is transmitted to the first registry server 162. Decryption of the application-related information is performed with the private key of the first registry server 162 at block 194.

Figure 9:
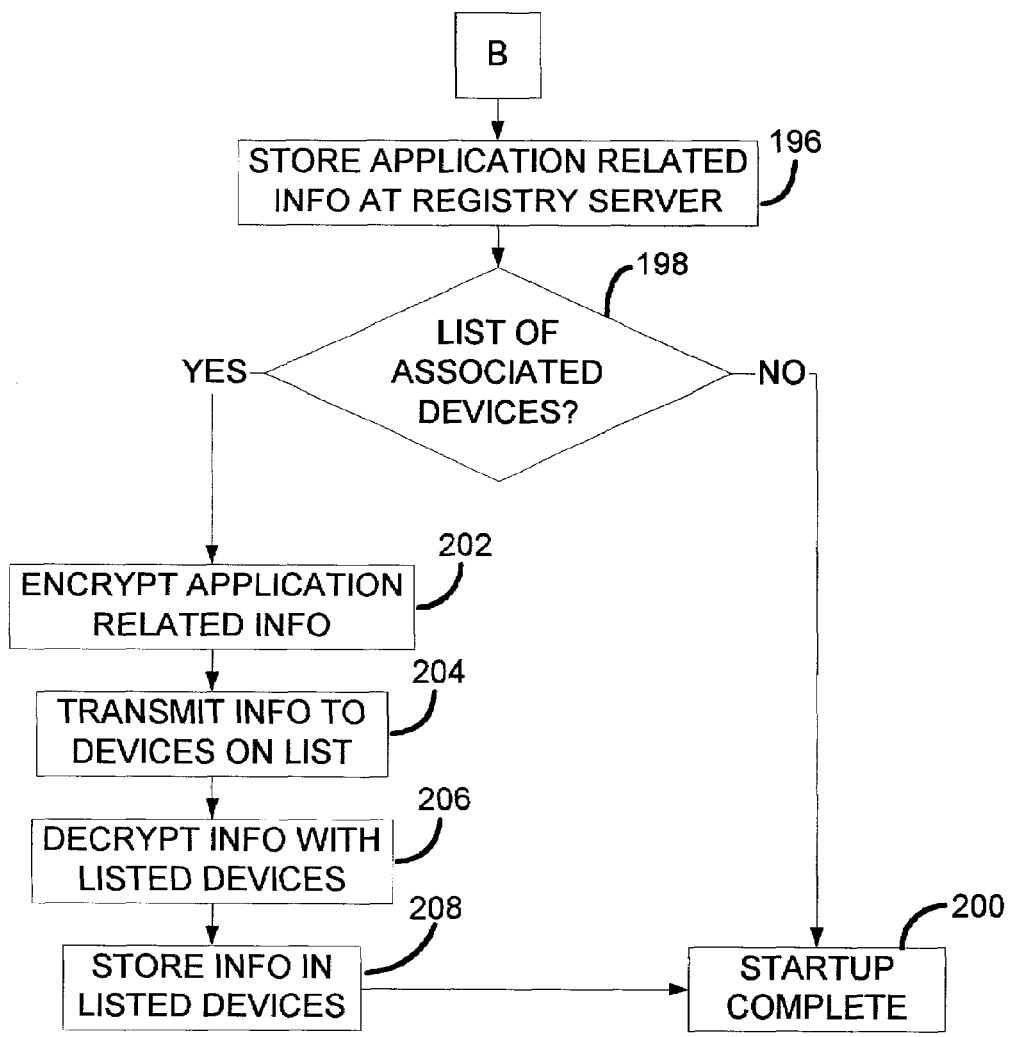
FIG. 9 is second portion of the flow diagram illustrated in FIG. 8.

Referring now to FIG. 9, the first registry server 162 stores the decrypted application-related information in the database 24 at block 196. At block 198, the first registry server 162 checks for a primary user list. The primary user list is a list of personal devices associated with the first primary user. If there is no primary user list, the application startup is complete at block 200.

If a primary user list is available, the first registry server 162 re-encrypts the application-related information using the public keys of the listed personal devices at block 202. At block 204, the encrypted application-related information is transmitted to the listed personal devices. In this embodiment, the second and third personal devices 152, 154 are on the primary user list. The listed personal devices (the second and third personal devices 152, 154) decrypt the encrypted application-related information using respective private keys at block 206. At block 208, the application-related information is stored in local storage within the listed personal devices (the second and third personal devices 152, 154). The application startup is complete at block 200.

2.2 Application Migration

Referring again to FIG. 7, in another embodiment, the first primary user wishes to migrate an application from the first personal device 150 to the fourth personal device 156. Migration of an application involves moving an instance of an operating application from a source device to a target device. For example, consider a user participating in a videoconference using video conferencing equipment in an office. Prior to the conclusion of the videoconference the user needs to leave the office. At this time, the user may migrate the still active videoconference from the video conferencing equipment (source device) to a personal device (target device) such as, for example, a PDA or other device with audio and video capability.

2.2.1 Basic Case

In the below example embodiment, migration of an application by the first primary user is from the first personal device 150 (source device) to the fourth personal device 156 (target device). Migration may be performed as a function of the first and second registry servers 162, 164 to authenticate that it is the first primary user who is requesting the migration and that the application is unchanged. In addition, authorization of the migration may be performed with the first and second registry servers 162, 164. In other embodiments, migration may be between any two personal devices. In still other embodiments, migrations may be between a personal device and any other device on the network 12.

In this embodiment, the second primary user has previously identified the first primary user as a potential user within the device record of the fourth personal device 156. Identification of the first primary user may occur during the registration process of the fourth personal device 156 as previously described. In other embodiments, migration may be from any personal device 14 to any other personal device 14 and may involve one or more registry servers 16. In yet another embodiment, migration may be between a personal device 14 and a non-personal device, such as for example, video conferencing systems or other any other system designed for common operation and sharing among a plurality of different users.

Figure 10:
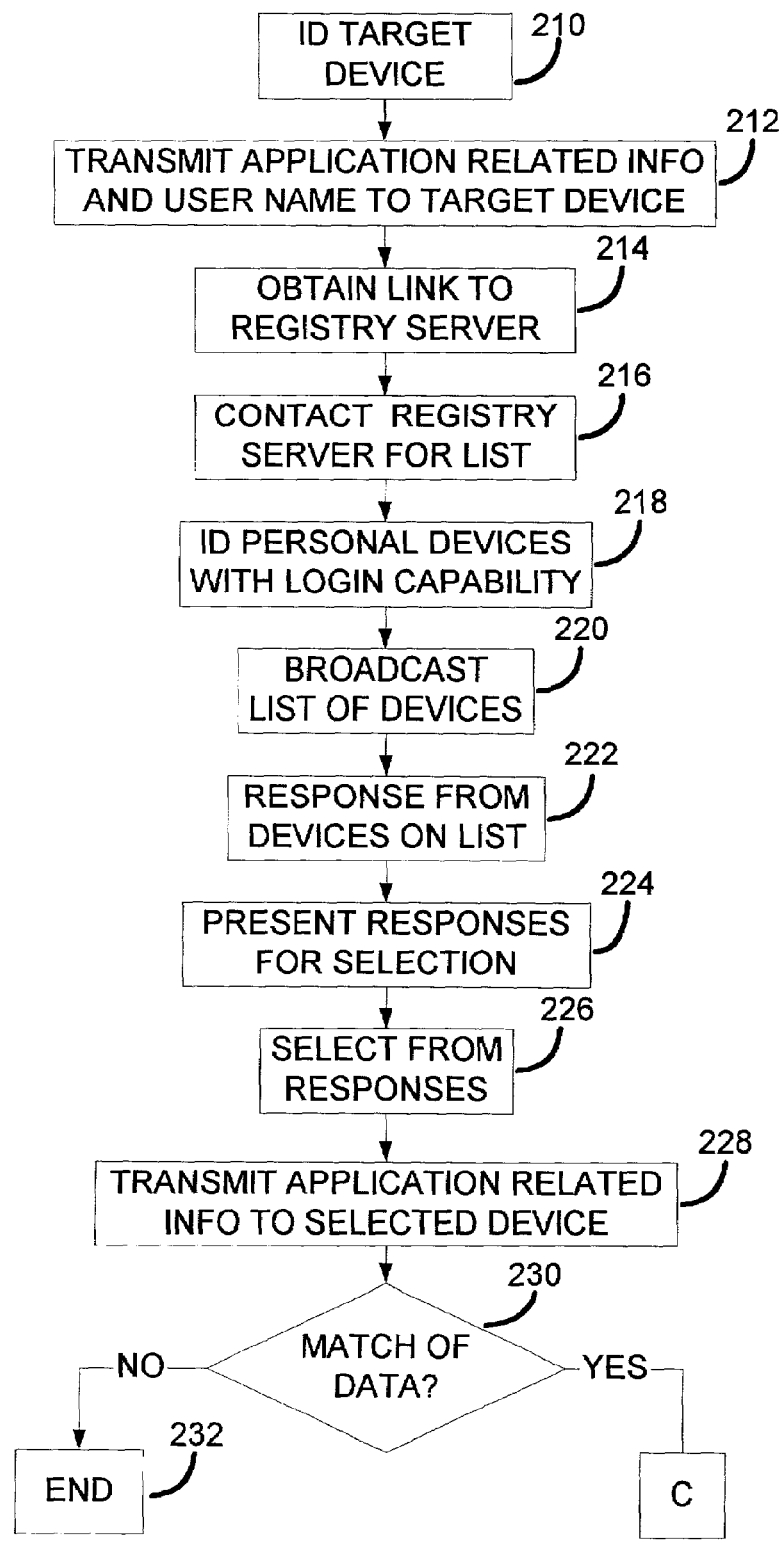
FIG. 10 is a flow diagram illustrating one embodiment of application migration with the registry architecture depicted in FIG. 7.

FIG. 10 is an exemplary process flow diagram illustrating migration of an application from the first personal device 150 to the fourth personal device 156 within the embodiment of the registry architecture 10 illustrated in FIG. 7. The first primary user has previously activated the first personal device 150 and launched an application.

At block 210, the first primary user identifies the fourth personal device 156 as the target device using the first personal device 150. The first personal device 150 transmits via secure connection application-related information along with the user name of the first primary user to the fourth personal device 156 at block 212. As previously described, the application-related information includes the session UID, the application name and the application password. At block 214, the fourth personal device 156 obtains the linking address of the first registry server 162. The linking address of the first registry server 162 is provided in the device record 32 (FIGS. 3 and 4) of the fourth personal device 156. The device record 32 may be stored within the fourth personal device 156, or obtained from the second registry server 164.

The fourth personal device 156 contacts the first registry server 162 to retrieve the primary user list of personal devices associated with the first primary user at block 216. The previously discussed personal device capability description 42 (FIGS. 3 and 4) is used at block 218 to identify personal devices in the primary user list specified by the first primary user for entry of login information. At block 220, the fourth personal device 156 broadcasts a message within the network 12 seeking a response from the identified personal devices on the primary user list with login capability. In the illustrated example, the second and third personal devices 152, 154 are listed and identified. In other examples fewer or more personal devices may be listed.

The listed personal devices in receipt of the broadcast respond to the fourth personal device 156 at block 222. For purposes of this example, the second personal device 152 responds. Upon receiving at least one response, the fourth personal device 156 presents the responding device(s) to the first primary user for selection at block 224. At block 226, the first primary user uses the fourth personal device 156 to select from the responding devices. In this example, the first primary user selects the second personal device 152. Upon selection, the fourth personal device 156 transmits through a secure connection, for example, SSL, the application-related information as well as the address of the fourth personal device 156 to the selected personal device at block 228.

At block 230, the selected device (the second personal device 152) compares the application-related information received from the fourth personal device 156 with the application-related information previously stored in the second personal device 152. The previously stored application-related information was received from the first registry server 162 when the application was launched on the first personal device 152 as previously described. If the application information does not match, the migration is denied at block 232.

Figure 11:
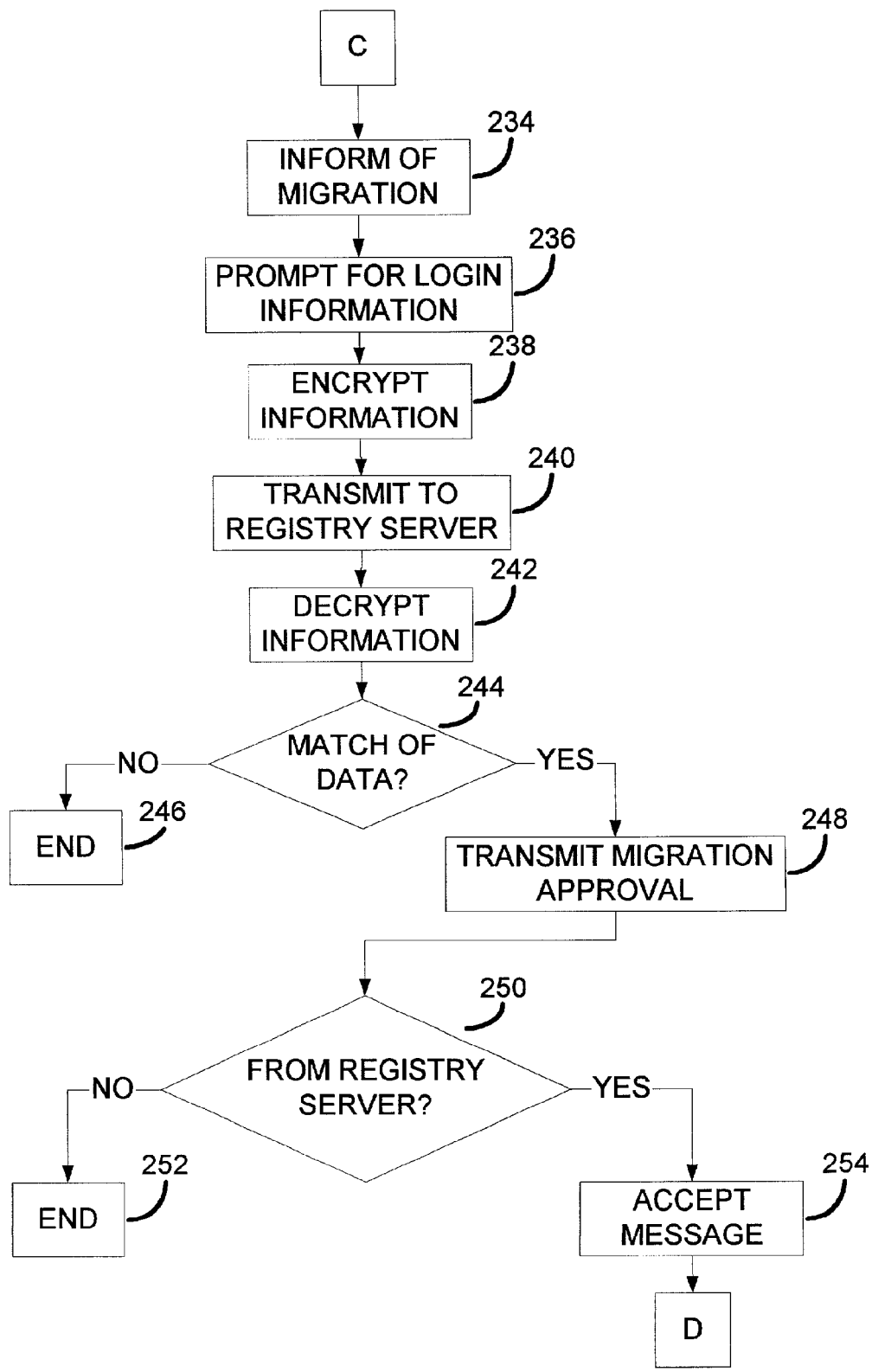
FIG. 11 is a second portion of the flow diagram illustrated in FIG. 10.

Referring now to FIG. 11, if a match is identified, the second personal device 152 informs the first primary user that the application wishes to migrate at block 234. A match of the application-related information confirms that the application has not been corrupted due to the matching session UID. In addition, a match of the application password confirms that the application is the same one started on the first personal device 150. The second personal device 152 prompts the first primary user for login information at block 236. Following successful entry of login information, at block 238 the second personal device 152 encrypts the login information and the application-related information as well as the address of the fourth personal device 156 with the public key of the first registry server 162.

The encrypted information is transmitted to the first registry server 162 at block 240. The private key of the first registry server 162 is used to decrypt the encrypted information at block 242. At block 244, the first registry server 162 compares the login information as well as the application-related information to the data in the database 24. If any of the data does not match, the migration terminates at block 246.

If the data matches, the first registry server 162 transmits a migration approval message, along with the session UID of the application to the fourth personal device 156 at block 248. The match by the first registry server 162 similarly authenticates as well as validates the identities of both the first primary user and the application. At block 250, the fourth personal device 156 determines if the migration approval message is from the first registry server 162. If no, the message is rejected at block 252. If the message is confirmed as from the first registry server 162, the fourth personal device 156 accepts the transmitted information at block 254. The fourth personal device 156 will accept a migration approval message only from the first registry server 162 due to the data in the device record 32 (FIGS. 3 and 4) pertaining to the first personal device 150.

Figure 12:
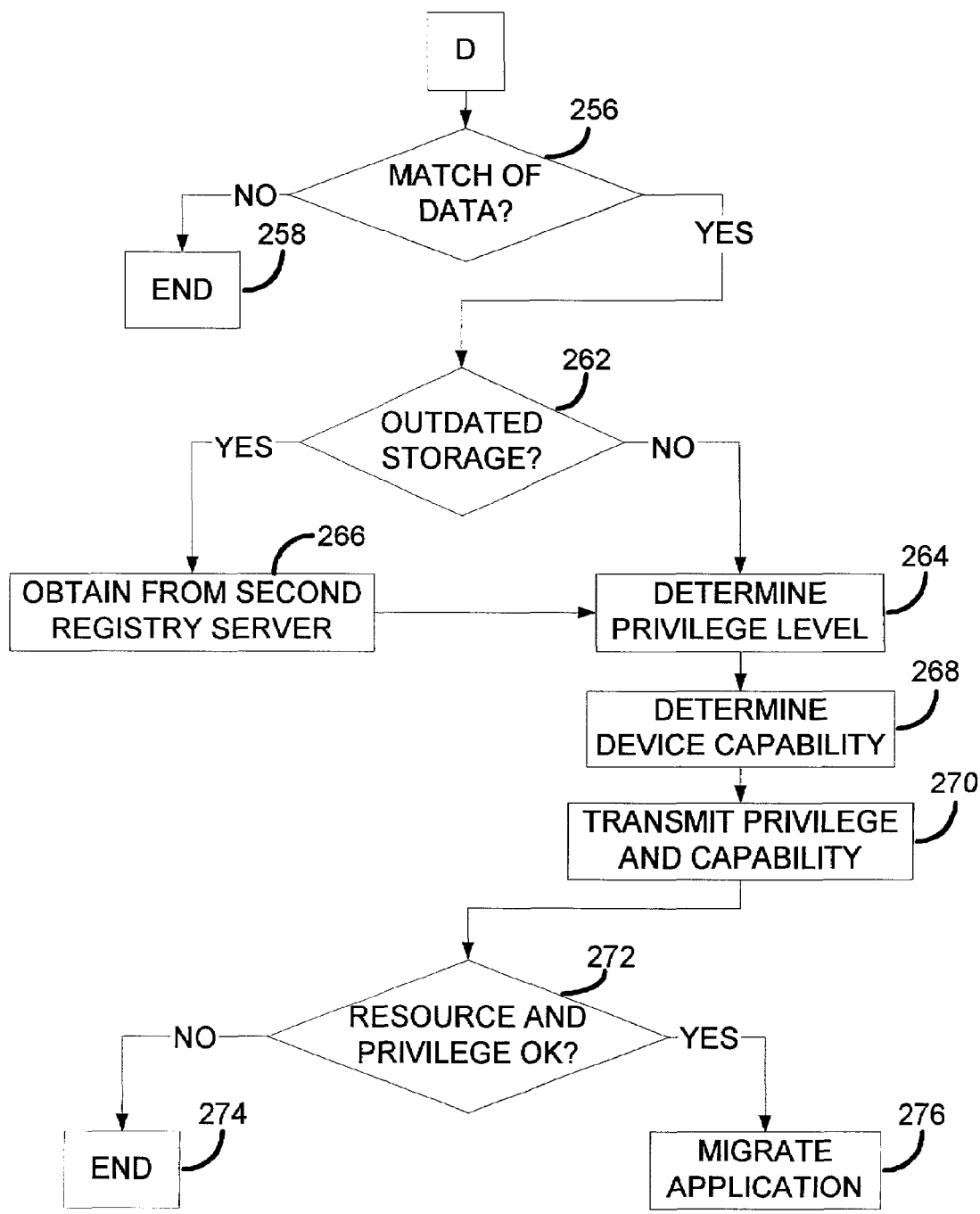
FIG. 12 is a third portion of the flow diagram illustrated in FIG. 10.

Referring now to FIG. 12, at block 256, the fourth personal device 156 compares the transmitted session UID with the stored session UID. If the session UIDs do not match, the migration terminates at block 258. As such, authentication/verification of the source of the transmitted information as well as the application itself is performed by the fourth personal device 156 utilizing data stored in local storage or obtained from the second registry server 164. If when compared, the session UIDs do match, the fourth personal device 156 determines whether the device record 32 (FIGS. 3 and 4) in local storage exists or is outdated at block 262. If the device record 32 exists and is not outdated, the privilege level 44 (FIGS. 3 and 4) assigned to the first primary user within the device record 32 is determined at block 264. If the device record 32 is outdated or non-existent, the device record 32 is updated/downloaded from the second registry server 164 at block 266, followed by determination of the privilege level 44 at block 264.

At block 268, the personal device capability description 42 (FIGS. 3 and 4) of the fourth personal device 156 is determined from the device record 32. The fourth personal device 156 transmits the personal device resource capability description 42 and the privilege level 44 of the fourth personal device 156 to the first personal device 150 using a secure connection established between the first and fourth personal devices 150, 156 at block 270. At block 272, the first personal device 150 compares the personal device resource capability description 42 and the privilege level 44 with the system resource and access requirement of the application. If either the capability of the fourth personal device 156 or the privilege granted for the first primary user on the fourth personal device 156 are inadequate the migration ends at block 274. If both are adequate, the application migrates from the first personal device 150 to the fourth personal device 156 using a secure connection, for example, SSL, established between the first and fourth personal devices 150, 156.

2.2.2 Peer Group Discovery and Migration

Referring again to FIG. 7, in another embodiment, peer-to-peer (P2P) computing techniques are utilized. In general, P2P computing techniques involve applications that allow direct network communications between users without the typical hierarchical client/server architecture associated with more traditional networks. A peer group is a collection of cooperating devices that provides a common set of services, such as, for example, the peer group described in project JXTA. In the presently preferred embodiments, at least one peer group may function within the registry architecture 10.

FIG. 7 illustrates the fourth, fifth and sixth personal devices 156, 158, 160 as forming a peer group 170. The peer group 170 may be any group of personal devices 14 that are organized around, and responsive to, at least one peer group name. The peer group name may be any unique identifier capable of being broadcast over the network 12 to invoke some form of response or other action from members of the peer group 170. For example, the peer group name may be associated with a roll call request. The roll call request may be multicast over the network 12 to identify those members of the peer group 170 currently monitoring communications within the network 12. Multicasting is a method of broadcasting to a selected audience. An example of multicasting is a conference call in which selected telephones are interconnected on a common communication line.

As in the previously discussed embodiments, the first primary user wishes to migrate an application from the first personal device 150 (source device) to the fourth personal device 156 (target device). In this embodiment, however, the fourth personal device 156 (target device) is part of the peer group 170. In addition, the fourth personal device 156 of this embodiment does not include sufficient resource capability to operate the application. Accordingly, the entirety of the application cannot be migrated to the fourth personal device 156. Instead of terminating the migration, the application may be subdivided into a first portion of the application that is a core portion and at least one second portion of the application that is at least one component.

The application may be considered as a plurality of components. Subdivision of the application may be based on, for example, identifying those components that are device dependent and those components that are device independent. Identification of the components may be performed by the source device, by the target device and/or by any other computing device in the network 12. Following identification, whatever components of the application that are non-device dependent may be migrated to an alternative target device instead of the target device. The alternative target device may be, for example, another personal device, a server computer or any other device in the network 12. In the illustrated embodiment, the peer group 170 preferably provides alternative target devices for such component off-loading in a seamless fashion.

The decision of where to migrate different components may be determined by the source device, the target device or any other device in the network 12. In one embodiment, the migration decision is performed through analysis of current resource availability at the time of the migration. In other embodiments, the migration decision may be predetermined, by, for example, using a list of devices. In still other embodiments, a predetermined decision may be used in conjunction with current resource availability to perform the migration decision.

Figure 13:
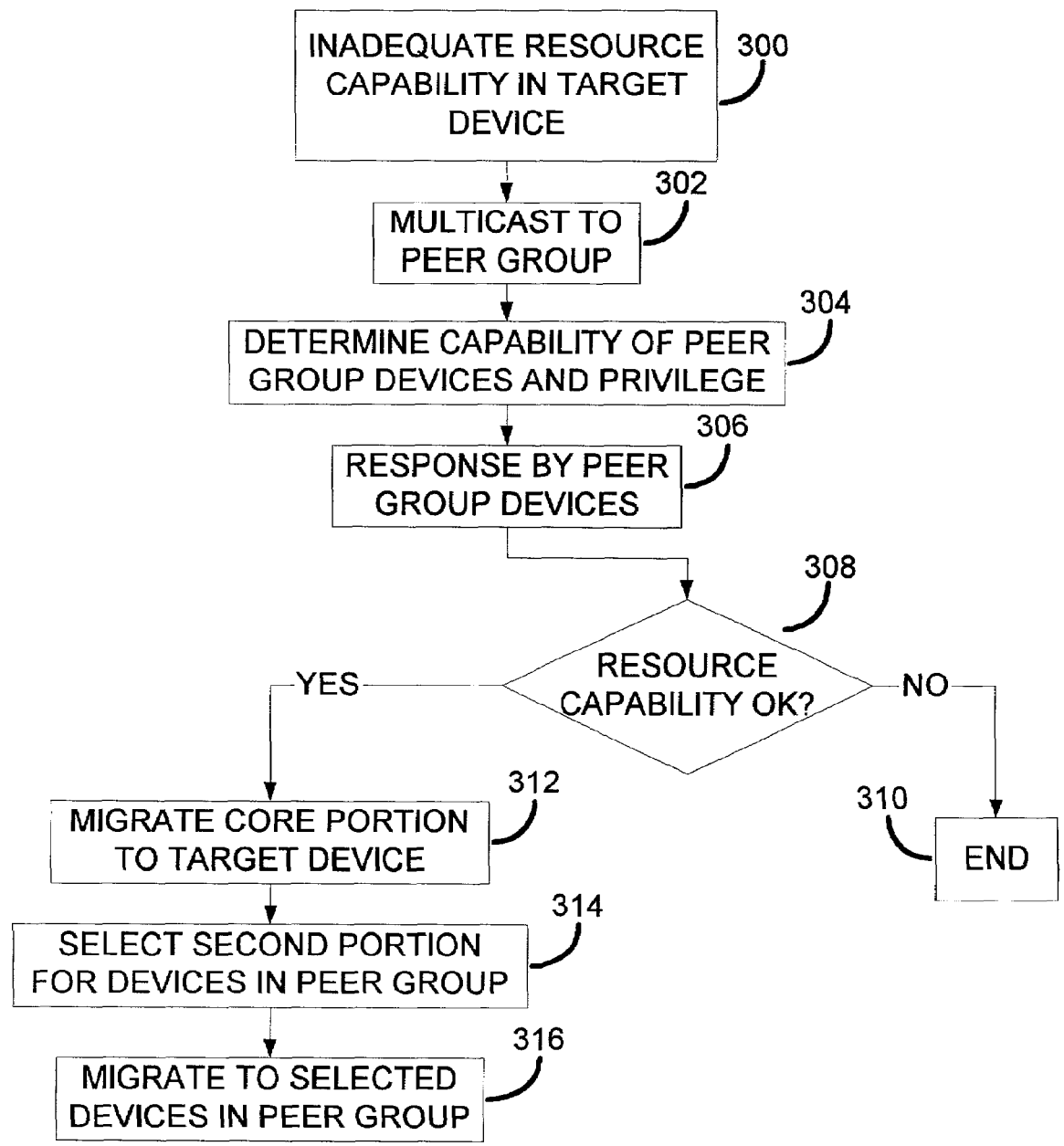
FIG. 13 is a flow diagram illustrating another embodiment of application migration within the registry architecture depicted in FIG. 7.

FIG. 13 is an exemplary process flow diagram illustrating peer group migration of an application from the first personal device 150 to the fourth personal device 156 within the embodiment of the registry architecture 10 illustrated in FIG. 7. The primary user has previously activated the first personal device 150 and launched an application as previously described with reference to FIGS. 8 and 9. In addition, the process of authorizing and authenticating the migration of the application to the fourth personal device 156 as previously described with reference to FIGS. 10–12 has been almost completed. The migration process has progressed to the point of transmitting the personal device resource capability description 42 and the privilege level 44 of the fourth personal device 156 to the first personal device 150 (see block 270 of FIG. 12).

The process of migration in this embodiment continues at block 300 where the first personal device 150 determines that the resources capability of the target device (the fourth personal device 156) is inadequate for the system resource requirement of the application. At block 302, the first personal device 150 multicasts the user name of the first primary user within the peer group 170 of the fourth personal device 156 using the peer group name. The personal devices within the peer group 170 (in the example embodiment, the fifth and sixth personal devices 158, 160) review their personal device resource capability description 42 (FIGS. 3 and 4) as well as the privilege level 44 (FIGS. 3 and 4) of the first primary user at block 304. The personal device resource capability description 42 and the privilege level 44 are obtained from the device record 32 (FIGS. 3 and 4) stored locally. If the device record 32 is outdated or non-existent, the fifth and sixth personal devices 158, 160 contact the third and fourth registry servers 166, 168, respectively to update or obtain the data.

At block 306, the fifth and sixth personal devices 158, 160 respond to the first personal device 150 with respective device capability and the privilege level of the first primary user. The first personal device 150 determines if sufficient resource capability exists between the peer group 170 (the fourth, fifth and sixth personal devices 156, 158, 160) at block 308. If resource capability is inadequate, the migration terminates at block 310. If adequate resources are available, the first personal device 150 migrates the core portion (first portion) of the application to the target device (the fourth personal device 156) at block 312. At block 314, appropriate components of the second portion of the application are selected for each responding personal device in the peer group 170 (the fifth and sixth personal devices 158, 160). The first personal device 150 migrates the components to the selected devices in the peer group 170 at block 316.

2.2.3 Hierarchical Trust Chain Migration

Figure 14:
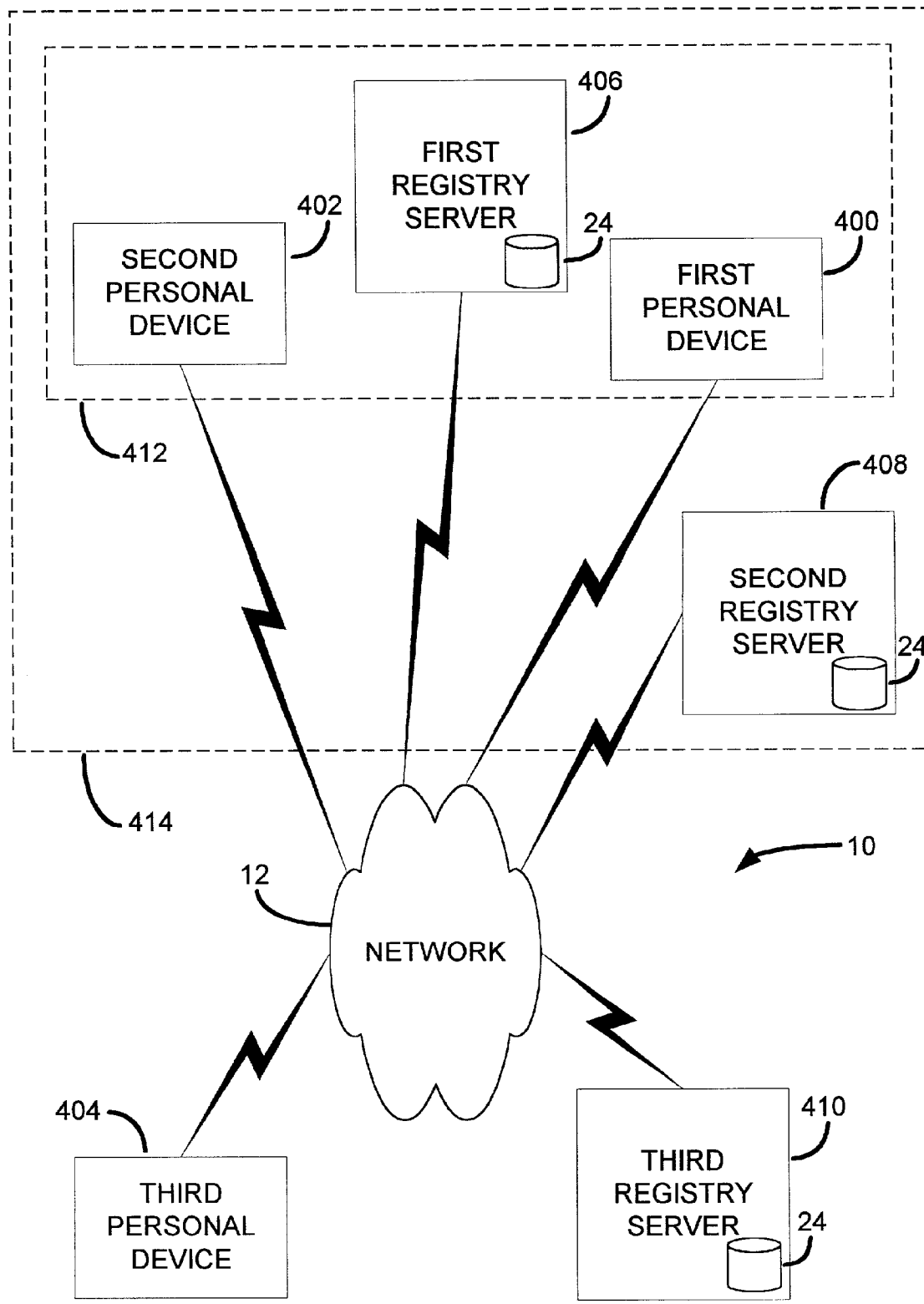
FIG. 14 is a block diagram of another embodiment of a registry architecture.

In another embodiment, the registry architecture forms a hierarchical trust chain. FIG. 14 illustrates an embodiment of the registry architecture 10 that includes a hierarchical trust chain. The registry architecture 10 includes a first personal device 400, a second personal device 402, a third personal device 404, a first registry server 406, a second registry server 408 and a third registry server 410 in operable communication over the network 12 as illustrated. The first, second and third personal devices 400, 402, 404 are similar to the previously discussed personal device 14 (FIG. 1). In addition, the first, second and third registry servers 406, 408, 410 include the database 24 and are similar to the previously discussed registry server 16 (FIG. 1). In other embodiments, fewer or additional personal devices, registry servers or any other devices capable of communicating over the network 12 may be included in the registry architecture 10.

In the illustrated embodiment, a first primary user utilizes the first personal device 400 and the second personal device 402. The first personal device 400 and the second personal device 402 are part of a subgroup 412. The subgroup 412 also includes the first registry server 406 as a subgroup registry server. The first and second personal devices 400, 402 have been registered under common ownership with the first registry server 406. The subgroup 412 is part of a group 414 that includes the second registry server 408 as a group registry server. In other embodiments, additional or fewer personal devices and/or registry servers may be included in the subgroup. Additional other subgroups and/or groups may also be included.

The first and second registry servers 406, 408 of one embodiment may be organizational registry servers (ORS). In this embodiment, the first registry server 406 may be identified as a subgroup ORS of the second registry server 408. In addition, the second registry server 408 may be identified as a group ORS. For example, the first registry server 406 may be used for a department within an organization and the second registry server 408 may be for the entire organization including other registry servers used for other departments.

The hierarchical trust chain may be formed with the first registry server 406 and the second registry server 408 due to the subgroup/group relationship. The hierarchical trust chain is an organizational structure providing secure exchange of information between subgroups within the group. Accordingly, authorization and verification are not required among members of the hierarchy. For those devices not part of the hierarchical trust chain, however, verification and authorization are still needed for any data entering the hierarchical trust chain.

In one embodiment, the second registry server 408 generally operates as a coordinator and facilitator of communication with the first registry server 406 and any other devices in the hierarchical trust chain. In this capacity, the second registry server 408 provide authorization and authentication as well as passing data between devices outside the hierarchical trust chain and devices within the hierarchical trust chain.

A second primary user utilizes the third personal device 404 in the exemplary embodiment. The third personal device 404 may be registered with the third registry server 410. The third registry server 410 may be an ORS of another organization or a PRS. It should be noted, however, that in the illustrated embodiment, the third personal device 404 and the third registry server 410 are not part of the hierarchical trust chain. In other embodiments, additional personal devices as well as registry servers may be included.

Figure 15:
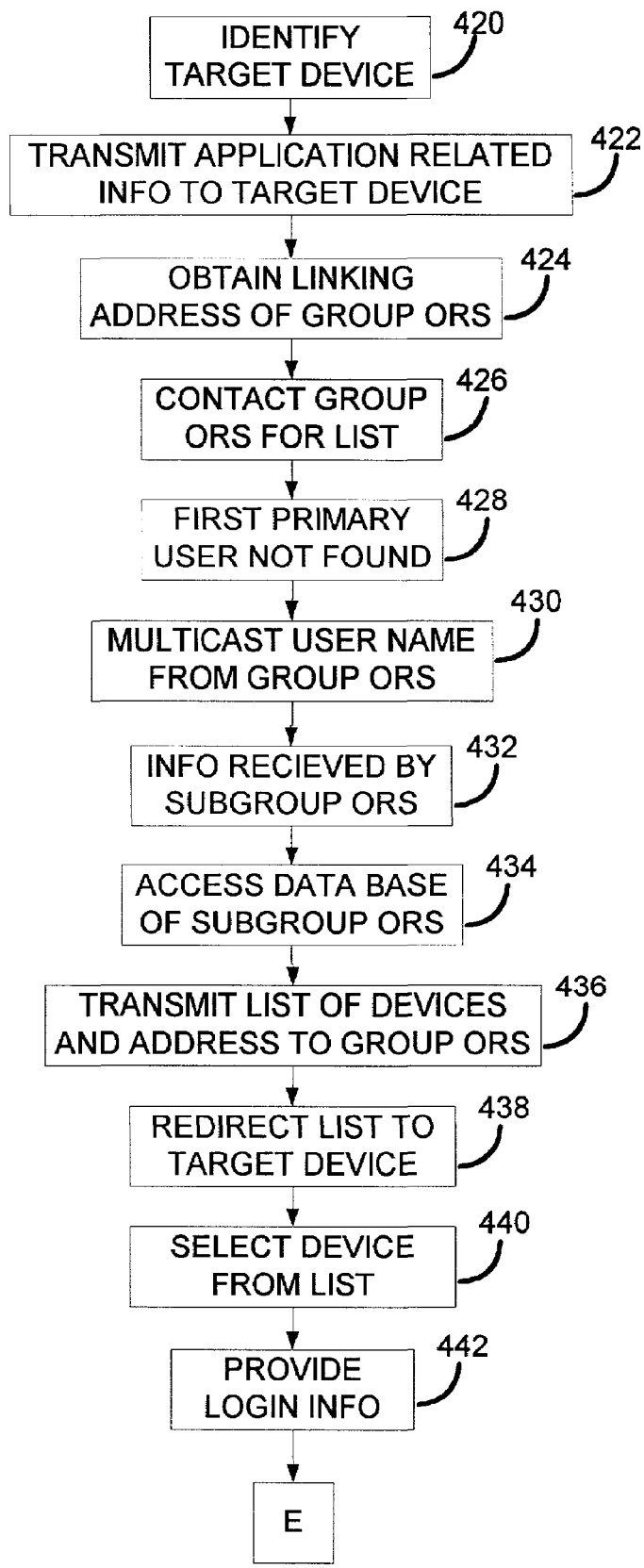
FIG. 15 is a flow diagram illustrating another embodiment of application migration within the registry architecture depicted in FIG. 14.

FIG. 15 is an exemplary process flow diagram to illustrate the migration of an application within the embodiment of the registry architecture 10 illustrated in FIG. 14. In the below discussion of operation, the first primary user has started an application on the first personal device 400 as previously described with reference to FIGS. 8 and 9. The first primary user now wishes to migrate the application to the third personal device 404. In other exemplary embodiments, the application may be migrated to any other device in the network 12. In many respects, the operation of the registry architecture 10 illustrated in FIG. 14 is similar to the operation described with reference to FIGS. 10–13. Accordingly, for reasons of brevity, the following discussions will concentrate on the differences.

The process begins at block 420 when the first primary user identifies the third personal device 404 as the target device using the first personal device 400. The first personal device 400 transmits the application-related information and a user name to the third personal device 404 at block 422. At block 424, the third personal device 404 obtains the linking address of the group ORS (the second registry server 408) from local storage or from the personal registry server 410. Note that the linking address provided in the device record 32 (FIG. 4) of this embodiment is for the group ORS (the second registry server 408) not the subgroup ORS (the first registry server 406) due to the trust chain hierarchy configuration.

The third personal device 404 contacts the group ORS (the second registry server 408) at block 426 to retrieve the primary user list of devices associated with the first primary user. The group ORS (the second registry server 408) determines that the first primary user is not within the database 24 of the second registry server 408 at block 428. At block 430, the group ORS (the second registry server 408) multicasts the user name of the first primary user to the subgroup ORSs. The subgroup ORS (the first registry server 406) receives the user name of the first primary user at block 432. At block 434, the subgroup ORS (the first registry server 406) accesses the associated database 24 and determines that the primary user list of personal devices associated with the first primary user is contained therein. The subgroup ORS (the first registry server 406) transmits the primary user list along with the linking address identifying the subgroup ORS (the first registry server 406) to the group ORS (the second registry server 408) at block 436. At block 438, the group ORS (the second registry server 408) redirects the data back to the target device (the third personal device 404) over the network 12.

The third personal device 404, broadcasts the retrieved primary user list, obtains devices from the list and allows the first primary user to select a personal device from the list at block 440. These operations are similar to the operation of the fourth personal device 156 (FIG. 7) described with reference to FIGS. 10–12. At block 442, the personal device selected from the primary user list (in this example embodiment the second personal device 402) informs of the migration and receives the login information. The login information is provided by the first primary user similar to the operation of the second personal device 152 (FIG. 7) described with reference to FIGS. 10–12.

Figure 16:
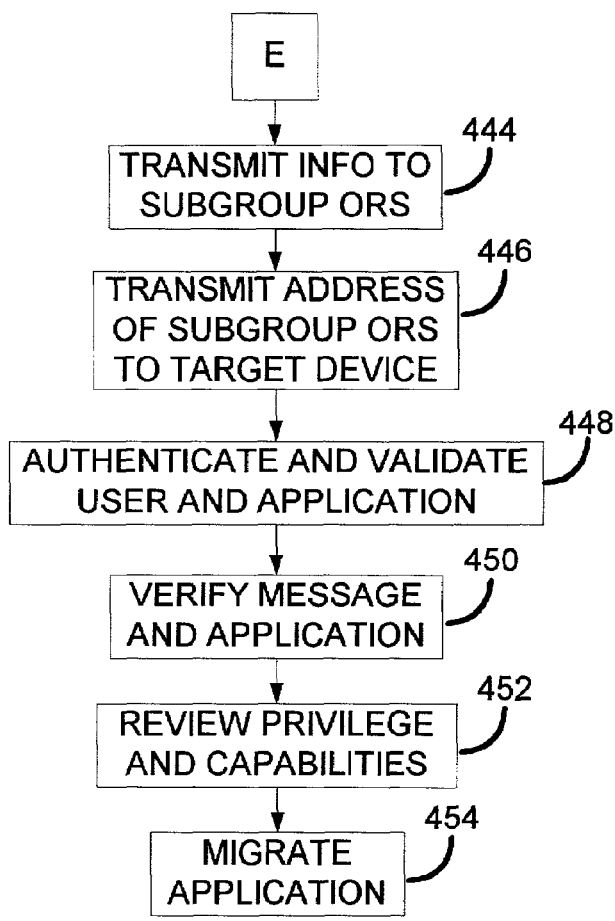
FIG. 16 is a second portion of the flow diagram illustrated in FIG. 15.

Referring now to FIG. 16, following successful entry of login information, at block 444 the second personal device 402 encrypts and transmits the login information, the application-related information as well as the address of the third personal device 404 to the subgroup ORS (the first registry server 406). In addition, at block 446, the group ORS (the second personal device 402) transmits the linking address of subgroup ORS (the first registry server 406) to the third personal device 404.

A communication link is now established between the subgroup ORS (the first registry server 406) and the third personal device 404. Authentication as well as validation of both the application and the first primary user by the group ORS (the first registry server 406) occurs at block 448. The authentication and validation is similar to the operation of the first registry server 162 of FIG. 7 described with reference to FIGS. 10–12. At block 450, the third personal device 404 verifies the migration approval message and the session UID of the application. Verification of the migration approval message and session UID are similar to the operation of the fourth personal device 156 of FIG. 7 in the embodiments discussed with reference to FIGS. 10–12. Review of privilege levels and resource capabilities in the device record 32 (FIG. 4) are performed at block 452. The privilege levels stored in the device record 32 (FIG. 4) of the third personal device 404 may be established for the group 414 instead of the first primary user. In other embodiments, the privilege level may be established for the primary user, the subgroup 412 or some other subset of the organization. At block 454, the application is migrated.

In other embodiments of the registry architecture 10 illustrated in FIG. 14 at least one peer group as described with reference to FIG. 7 may also be included. Further, migration of applications as a plurality of components may also occur as in the operational embodiments described with reference to FIG. 13. In still other embodiments, a PRS, an ORS, a peer group and/or a hierarchical trust chain may be operational within the registry architecture 10.

2.3 Application Shut Down

Application shut down within the previously described embodiments of the registry architecture also includes authentication and authorization.

Referring once again to FIG. 7, for purposes of this illustrative embodiment, the first primary user is currently running an application on the fourth personal device 156. As in the previous embodiments, the first primary user is associated with the first, second and third personal devices 150, 152, 154 by registration with the first registry server 162. In addition, the second primary user is associated with the fourth personal device 156 by registration with the second registry server 164. In this illustrative embodiment, the first primary user previously launched an application from one of the first, second and third personal devices 150, 152, 154 and migrated the application to the fourth personal device 156. In other embodiments, an application operated by any user on any personal device may be shut down in a similar fashion.

Figure 17:
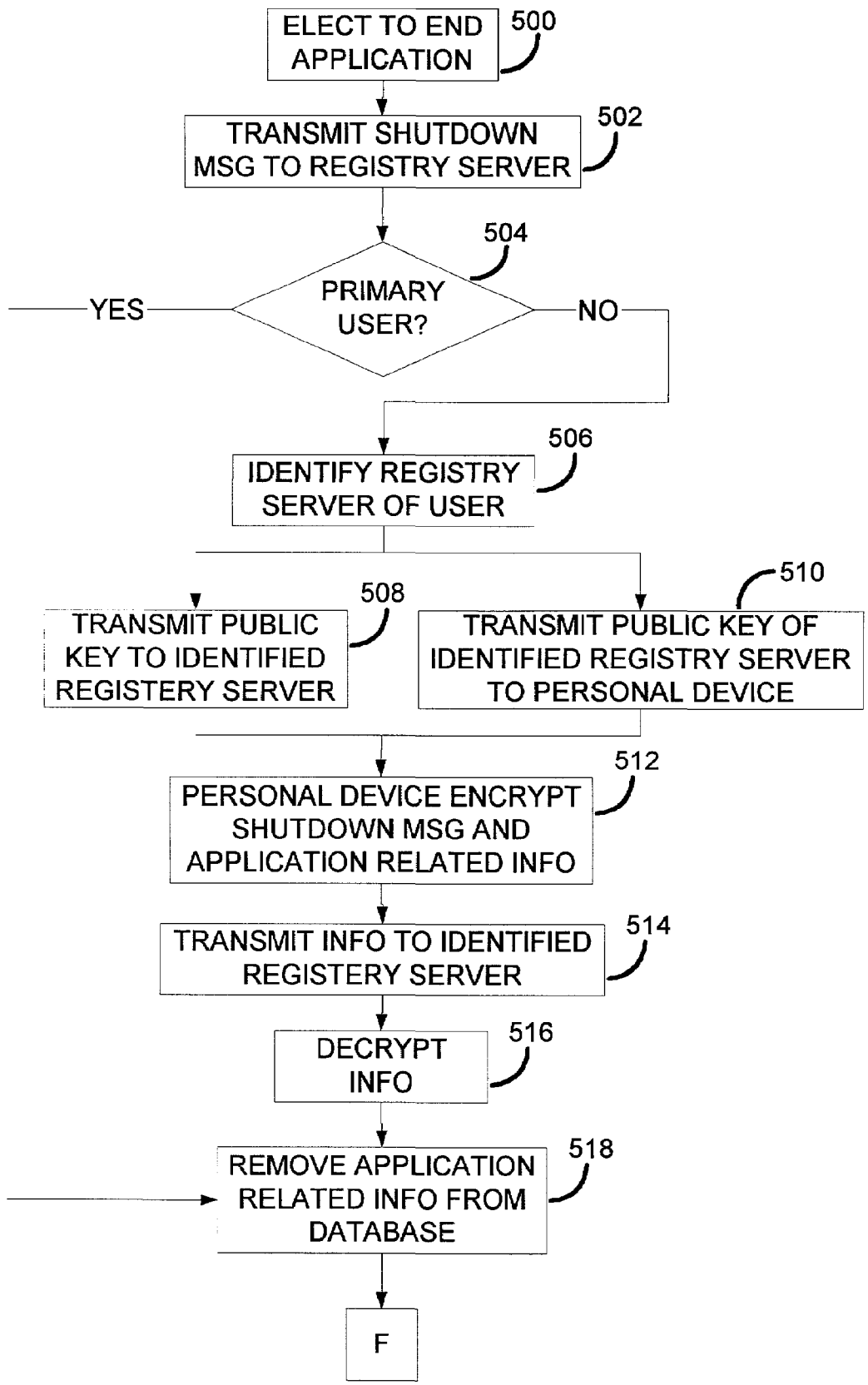
FIG. 17 is a flow diagram illustrating ending an application within the registry architecture depicted in FIG. 7.

FIG. 17 is an example of a process flow diagram to illustrate the shutdown of an application within the embodiment of the registry architecture 10 illustrated in FIG. 7. The process begins at block 500, where a user elects to end the application running on the fourth personal device 156. At block 502, the fourth personal device 156 transmits a shutdown request to the second registry server 164. The shutdown request may include a user name or any other unique identification of the user that may be transmitted over the network 12. The second registry server 164 determines if the shutdown request is from the second primary user at block 504. If yes, the process proceeds to block 518.

If the user is not the second primary user, the second registry server 164 identifies the linking address of the registry server associated with the user making the shutdown request at block 506. The linking address is obtained from the device record 32 (FIGS. 3 and 4) for the fourth personal device 156 contained in the database 24 of the second registry server 164. In the illustrated example, the user is the first primary user and the second registry server 164 obtains the linking address of the first registry server 162. At block 508, the second registry server 164 sends the public key of the fourth personal device 156 to the identified registry server (the first registry server 162) through a secure connection, such as, for example, SSL. In addition, at block 510, the second registry 164 transmits the public key of the first registry server 162 to the fourth personal device 156 using a secure connection.

The fourth personal device 156 encrypts the shutdown message along with the application-related information at block 512. The message and information are encrypted with the public key previously supplied from the first registry server 162. At block 514, the fourth personal device 156 transmits the encrypted data to the first registry server 162. The private key of the first registry server 162 is used to decrypt the message at block 516. At block 518, the first registry server 162 (or the second registry server 164 if the second primary user is shutting down the application) removes the application-related information from the database 24. As previously discussed with reference to FIGS. 5 and 6, the application-related information may be stored in the database 24 when the application is launched.

Figure 18:
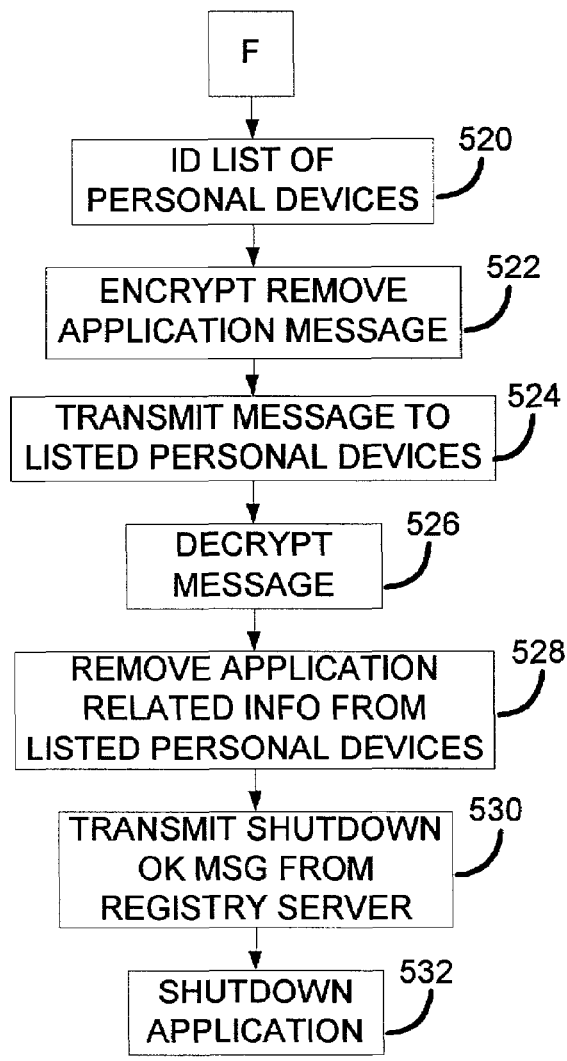
FIG. 18 is a second portion of the flow diagram illustrated in FIG. 17.

Referring now to FIG. 18, the first registry server 162 (second registry server 164) identifies the primary user list of personal devices associated with the first (second) primary user at block 520. At block 522, a remove application-related information message is encrypted with the public key of each of the personal devices in the primary user list of personal devices. The encrypted message is transmitted to the personal devices on the primary user list at block 524. In the example embodiment, the encrypted message is transmitted to the second and third personal devices 152, 154. At block 526, the listed personal devices (the second and third personal devices 152, 154) receive and decrypt the encrypted message with respective private keys. The listed personal devices remove the application-related information at block 528. The application-related information may be previously stored in local storage of the listed personal devices when the application was launched. At block 530, the first registry server 162 (second registry server 164) transmits a shutdown ok message to the fourth personal device 156. The fourth personal device 156 terminates the application at block 532.

3.0 Application Authentication

In another embodiment, personal devices within the registry architecture may also include additional security in the form of application authentication. Application authentication may add assurance that applications have been created by a trusted source and remain unaltered. Techniques for implementing application authentication may be implemented during the development stage and include local resource utilization verification and digital signatures by developers.

Local resource utilization provides added security for various functionality relating to resource utilization by an application(s). Implementation involves specifying an expected system resource access requirement during the application development stage. When the application is launched, the expected system resource access requirement may be provided by the application to the personal device 14 (FIG. 1) running the application. The personal device 14 may include a monitoring function capable of alerting the user when the expected system resource access requirement is exceeded.

Digital signatures by developers may prevent tampering with the application code during application distribution and/or migration. In addition, the digital signature may allow verification that the application is not an unauthorized copy. Tampering, alteration, corruption or unauthorized copying of the application may destroy or otherwise alter the digital signature. In this embodiment, the developer may digitally "sign" each copy of the application using private keys. The application private key may be stored on a registry server utilized by the developer of the application. The corresponding public key, or a linking address of the registry server containing the private/public key pair, may be distributed with the application. When the application is launched, if the public key is distributed with the application, verification of the digital signature may be performed by decrypting the digital signature with the public key. Alternatively, if the linking address is distributed with the application, verification may involve using the linking address to download the public key from the registry server. Downloading may be performed with a secure connection, such as, for example, SSL. Following downloading, verification of the digital signature may be performed with the public key. An exemplary application is a music file. In this example, the seller of the music file includes a digital signature and transmits the music file to the purchaser. When the purchaser launches the music file, authentication of the music file may be performed.

Figure 19:
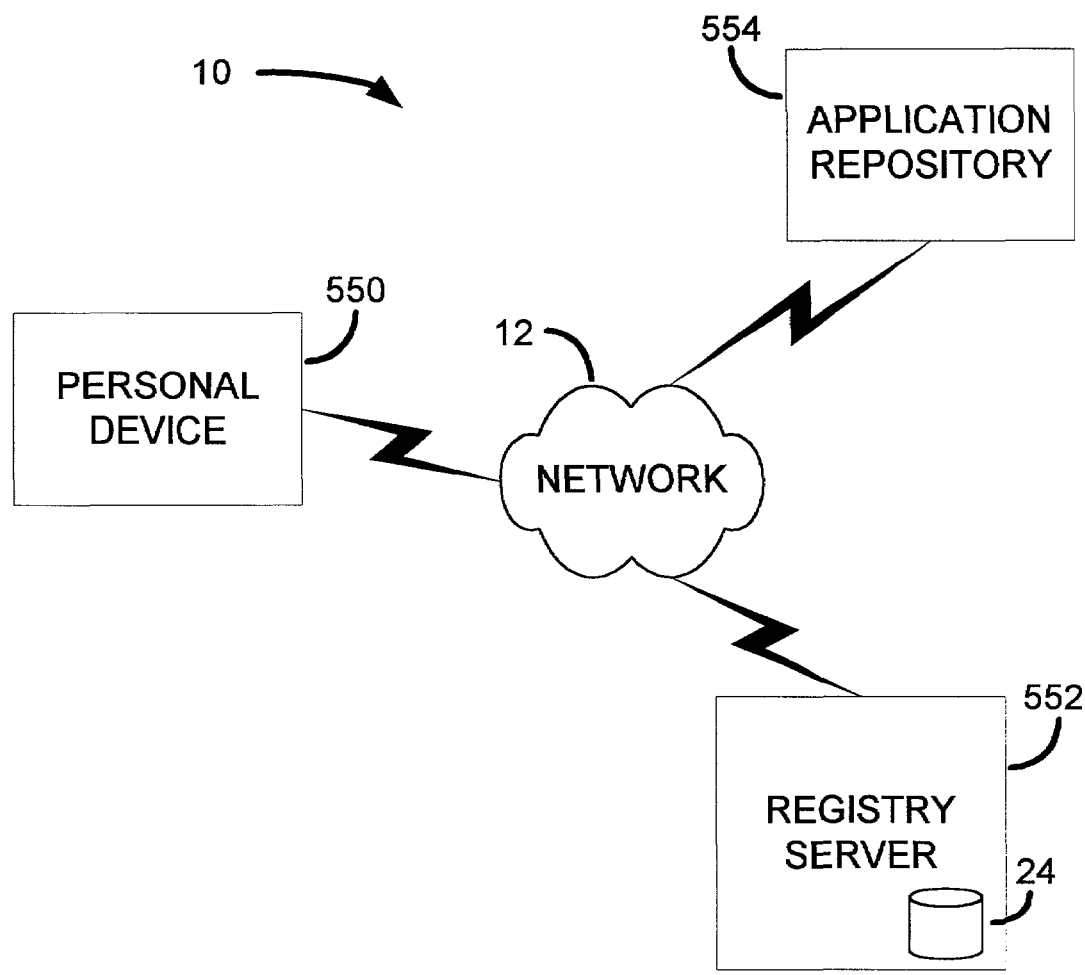
FIG. 19 is a block diagram of another embodiment of a portion of a registry architecture.

FIG. 19 is a block diagram illustrating another embodiment of a portion of a registry architecture 10. The registry architecture 10 includes at least one personal device 550, at least one registry server 552 and at least one application repository 554 in operable communication over the network 12 as illustrated. The personal device 550 is utilized by a primary user and is similar to the personal device 14 previously discussed with reference to FIG. 1. Similarly, the registry server 552 includes a database 24 and is similar to the registry server 16 discussed with reference to FIG. 1. The registry server 552 of this embodiment, however, is the registry server utilized by a developer of an application to store the private/public key pair for the application.

The application repository 554 may be a server computer, a workstation, a personal device, a registry server or any other device with processing and storage capability that may communicate over the network 12. The application repository 554 may be used to store applications for download by the personal device 550. An example of this functionality is shareware commonly available on the Internet. In other embodiments, the applications may be downloaded from the application repository 554 using communication mechanisms other than the network 12, such as, for example, a direct modem connection or any other mechanism for linking the personal device 550 with the application repository 554.

Figure 20:
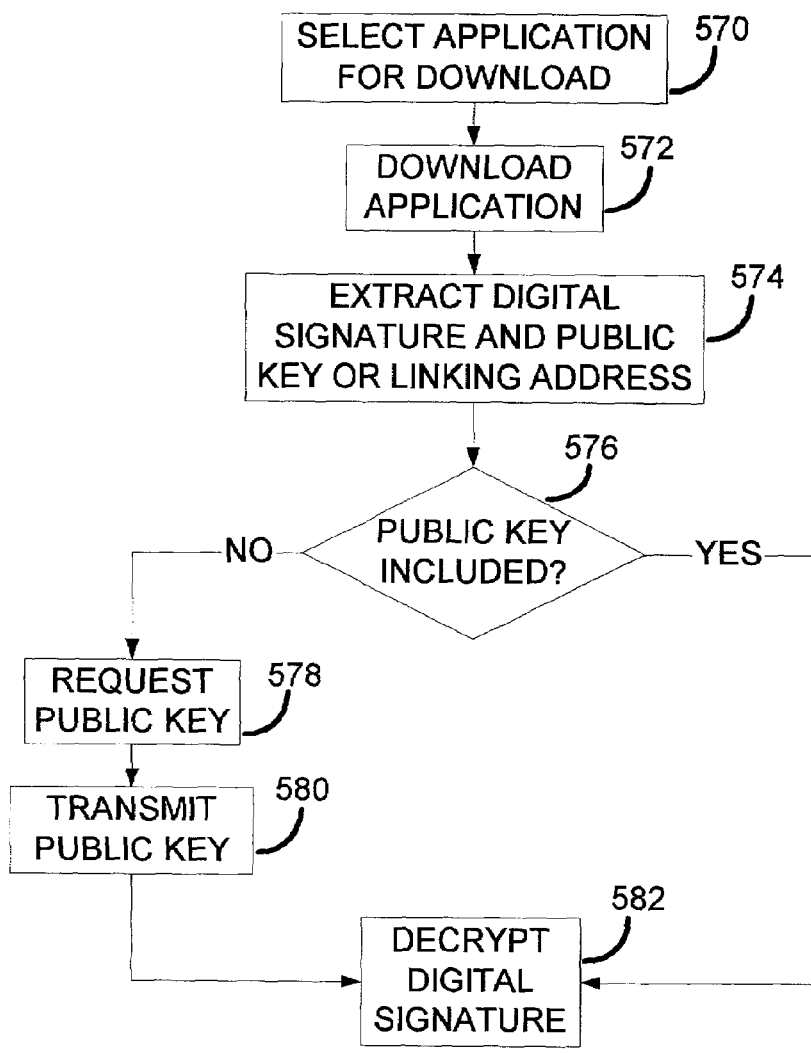
FIG. 20 is a flow diagram illustrating downloading and starting an application within the registry architecture depicted in FIG. 19.

FIG. 20 is an example of a process flow diagram to illustrate the digital signature verification of an application within the registry architecture 10 illustrated in FIG. 19. The process begins at block 570, where the personal device 550 selects an application for download from the application repository 554. At block 572, the application, or the application components, is downloaded over the network 12 to the personal device 550. The download of the application may include the digital signature and the public key of the developer or the linking address of the registry server 552. The personal device 550 extracts the digital signature and the linking address or the public key from the application at block 574. At block 576, the personal device 550 determines if the public key is included in the download.

If the public key is not included, the personal device 550 contacts the registry server 552 using the linking address to request the public key at block 578. At block 580, the public key of the registry server 552 is transmitted to the personal device 550. The personal device 550 decrypts and verifies the authenticity of the digital signature with the public key at block 582. If the public key is included, the personal device 550 proceeds directly to block 582 and authenticates the digital signature with the public key.

Once the digital signature is authenticated, the application may be launched as previously described with reference to FIG. 8. In other embodiments, the registry architecture 10 may include a peer group and/or a hierarchical trust chain as in the previously described embodiments. In still other embodiments, a second personal device may direct downloading of an application to a first personal device.

The previously discussed embodiments of the registry architecture provide a distributed security architecture capable of performing both an authentication and an authorization function. The architecture performs security functions for users operating personal devices as the primary user as well users operating personal devices borrowed from other primary users. The ability to provide secure access to personal devices with pre-configurable access levels allows users to share personal devices with other users while minimizing the possibility of misuse or undesirable usage. In addition, the ability to provide single user, peer group, and/or hierarchical group user authentication allows similar security performance for both individual owners and business organizations. Further, the ability to perform verification and authorization of applications both when launched and when migrated among different personal devices enhances mobility, flexibility and resource sharing, while maintaining operational security. Finally, network communication as well as device caching of security information provides highly flexible authentication and verification without compromising mobility, or limiting a user to a specific personal device.

Due to the distributed nature of the registry architecture, the owner may maintain significant control over information relating to personal devices as well as users. In addition, passwords and other security sensitive information may be shielded from exposure to non-trusted devices and systems. Further, the registry architecture is readily scaleable to operate with any number of personal devices and registry servers.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of securely sharing personal devices among different users, the method comprising:
  a) registering a first personal device utilized by a first primary user with a first registry server;
  b) registering a second personal device utilized by a second primary user with a second registry server;
  c) registering a third personal device utilized by a third primary user with a third registry server, wherein the first and third personal devices form a peer group;
  d) launching an application on the first personal device by the first primary user; and
  e) facilitating secure migration of the application from the first personal device to the second personal device as a function of security information contained in the first and second registry servers, wherein when resource capabilities of the second personal device are insufficient to operate the entirety of the application and c) further comprises: multicasting a user name among the peer group; identifying the privilege level of the first primary user to utilize the third personal device; and migrating a first portion of the application to the second personal device and a second portion of the application to the third personal device.

2. A method of securely migrating an application operating on a first personal device to a second personal device, the method comprising:
  a) initiating the migration;
  b) transmitting to the second personal device a list of personal devices associated with a user of the first personal device;
  c) authenticating the user with login information entered with a third personal device identified in the list;
  d) transmitting authentication approval to the second personal device; and
  e) migrating the application from the first personal device to the second personal device.

3. The method of claim 2, wherein d) comprises:
transmitting a privilege level and resource capability of the second personal device to the first personal device; and
confirming the privilege level and resource capability of the second personal device with the first personal device.

4. The method of claim 2, wherein b) comprises:
identifying at least one personal device in the list that is specified for entry of login information; and
broadcasting a message to the at least one personal device.

5. The method of claim 2, wherein b) comprises:
selecting the third personal device from the list;
transmitting application-related information to the third personal device; and
verifying the application is the same as the application operating on the first personal device as a function of the application-related information.

6. The method of claim 2, wherein d) comprises transmitting a session universal identification to the second personal device.

7. The method of claim 6, further comprising comparing a stored session universal identification with the transmitted session universal identification to verify the application.

8. The method of claim 2, wherein a) comprises transmitting application-related information and a user name from the first personal device to the second personal device.

9. The method of claim 2, wherein a) comprises transmitting at least one of a session universal identification for the application, the name of the application, an application password and a user name from the first personal device to the second personal device.

10. A method of securely migrating an application operating on a first personal device to a second personal device, the method comprising:
  a) transmitting application-related information and a user name from a first personal device to a second personal device;
  b) authenticating the first personal device and the application with the second personal device as a function of a registry server, wherein b) comprises:
    transmitting the user name and application-related information to a third personal device;
    entering login information with the third personal device; and
    transmitting the login information, the user name and the application-related information to the registry server for authentication;
  c) transmitting a privilege level and resource capability of the second personal device to the first personal device;
  d) confirming the privilege level and resource capability of the second personal device with the first personal device; and
  e) migrating the application from the first personal device to the second personal device.

11. A method of securely migrating an application operating on a first personal device to a second personal device, the method comprising:
  a) transmitting application-related information and a user name from a first personal device to a second personal device;
  b) authenticating the first personal device and the application with the second personal device as a function of a registry server, wherein the registry server comprises a group registry server and a subgroup registry server, the subgroup registry server comprising a list of personal devices utilized by a primary user of the first personal device and wherein b) comprises:
    requesting the list from the group registry server;
    multicasting a user name of the primary user to the subgroup registry server;
    transmitting the list from the subgroup registry server to the group registry server; and
    transmitting the list to the second personal device;
  c) transmitting a privilege level and resource capability of the second personal device to the first personal device;
  d) confirming the privilege level and resource capability of the second personal device with the first personal device; and
  e) migrating the application from the first personal device to the second personal device.

12. The method of claim 11, further comprising transmitting a linking address of the second personal device to the subgroup registry server.

13. The method of claim 11, further comprising transmitting a linking address of the subgroup registry server to the second personal device.

14. A method of authentication and authorization of an application and a user desiring to migrate the application, the method comprising:
  a) registering a first and second personal device with a registry server;
  b) the user launching an application on the first personal device;
  c) receiving application-related information from the first personal device at the registry server;
  d) enabling the second personal device as a function of the application-related information to receive login information from the user;
  e) transmitting to the registry server at least one of the login information and the application-related information; and
  f) authenticating the user and the application with the registry server as a function of at least one of the login information and the application-related information to approve the migration
  g) receiving a shutdown message at the registry server;
  h) removing the application-related information from the registry server;
  i) instructing the second personal device to remove the application-related information; and
  j) transmitting a shutdown ok message to the first personal device.

15. A system for sharing personal devices among different users, the system comprising:
  a first personal device and a second personal device;
  at least one registry server in communication with the first and second personal devices, the registry server comprising a database, wherein the at least one registry server comprises a group registry server and at least one subgroup registry server;
  the database comprising security information for at least one of the first and second personal devices, wherein the registry server is operable to authorize execution and secure migration of an application between the first personal device and the second personal device.

16. The system of claim 15, wherein the security information within the database of the group registry server comprises a subgroup identifier, a linking address to the at least one subgroup registry server and a public key for the at least one subgroup registry server.

17. A system for sharing personal devices among different users, the system comprising:
- a first personal device and a second personal device;
- at least one registry server in communication with the first and second personal devices, the registry server comprising a database;
- the database comprising security information for at least one of the first and second personal devices, wherein the registry server is operable to authorize execution and secure migration of an application between the first personal device and the second personal device; and
- a third personal device in communication with the at least one registry server and the first and second personal device, the third personal device operable to communicate login information to the registry server for authentication of a user by the registry server.

18. The system of claim 17, wherein the third personal device is operable to communicate an application password, a session universal identification for the application and an application name to the registry server for authentication of the application by the registry server.

* * * * *